(12) United States Patent
Tock et al.

(10) Patent No.: US 7,877,459 B2
(45) Date of Patent: *Jan. 25, 2011

(54) METHOD AND SYSTEM FOR MODIFYING REQUESTS FOR REMOTE RESOURCES

(75) Inventors: Theron Tock, Mountain View, CA (US); Sampath Srinivas, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 751 days.

This patent is subject to a terminal disclaimer.

(21) Appl. No.: 11/423,087

(22) Filed: Jun. 8, 2006

(65) Prior Publication Data
US 2006/0218242 A1 Sep. 28, 2006

Related U.S. Application Data

(63) Continuation of application No. 09/706,182, filed on Nov. 3, 2000, now Pat. No. 7,085,817.

(60) Provisional application No. 60/235,513, filed on Sep. 26, 2000.

(51) Int. Cl.
*G06F 15/173* (2006.01)
(52) U.S. Cl. .................................................. 709/217
(58) Field of Classification Search .................. 709/217, 709/223, 227, 228
See application file for complete search history.

(56) References Cited

U.S. PATENT DOCUMENTS

| 5,491,752 | A |  | 2/1996 | Kaufman et al. |
| 5,586,260 | A |  | 12/1996 | Hu |
| 5,752,022 | A |  | 5/1998 | Chiu et al. |
| 5,799,318 | A |  | 8/1998 | Cardinal et al. |
| 5,812,769 | A | * | 9/1998 | Graber et al. ............... 709/228 |
| 5,826,242 | A |  | 10/1998 | Montulli |
| 5,898,836 | A |  | 4/1999 | Freivald et al. |
| 5,935,212 | A |  | 8/1999 | Kalajan et al. |
| 5,948,066 | A |  | 9/1999 | Whalen et al. |

(Continued)

FOREIGN PATENT DOCUMENTS

EP    0 855 659 A1    7/1998

(Continued)

OTHER PUBLICATIONS

NetMind, "Products: Free Mind-it Service," Information Datasheet, Netmind, http://www.netmind.com/html/free_mind-it_service.html, downloaded Jul. 4, 2000, pp. 1-2.

(Continued)

*Primary Examiner*—David Y Eng
(74) *Attorney, Agent, or Firm*—Harrity & Harrity, LLP

(57) ABSTRACT

Techniques for modifying requests or browser viewable documents (e.g., markup language documents) are described. By modifying requests or browser viewable documents, access to resources residing on remote servers through an intermediate server is facilitated. In one embodiment, Universal Resource Locators (URLs) associated with requests or markup language documents are modified. The techniques are suitable for both secure and unsecure requests. The techniques can also modify requests or browser viewable documents at the intermediate server, a client device, or both.

11 Claims, 19 Drawing Sheets

U.S. PATENT DOCUMENTS

| | | | |
|---|---|---|---|
| 5,978,842 | A | 11/1999 | Noble et al. |
| 5,983,268 | A | 11/1999 | Freivald et al. |
| 5,987,523 | A | 11/1999 | Hind et al. |
| 5,991,878 | A | 11/1999 | McDonough et al. |
| 6,006,258 | A | 12/1999 | Kalajan |
| 6,012,087 | A | 1/2000 | Freivald et al. |
| 6,029,182 | A | 2/2000 | Nehab et al. |
| 6,052,730 | A * | 4/2000 | Felciano et al. ............. 709/225 |
| 6,141,686 | A | 10/2000 | Jackowski et al. |
| 6,167,438 | A * | 12/2000 | Yates et al. ................. 709/216 |
| 6,182,141 | B1 | 1/2001 | Blum et al. |
| 6,185,598 | B1 | 2/2001 | Farber et al. |
| 6,199,104 | B1 | 3/2001 | Delph |
| 6,202,156 | B1 | 3/2001 | Kalajan |
| 6,205,481 | B1 * | 3/2001 | Heddaya et al. ............. 709/226 |
| 6,260,187 | B1 | 7/2001 | Cirne |
| 6,266,681 | B1 | 7/2001 | Guthrie |
| 6,289,333 | B1 * | 9/2001 | Jawahar et al. ................. 707/2 |
| 6,298,356 | B1 | 10/2001 | Jawahar et al. |
| 6,304,908 | B1 | 10/2001 | Kalajan |
| 6,356,934 | B1 | 3/2002 | Delph |
| 6,401,077 | B1 | 6/2002 | Godden et al. |
| 6,466,966 | B1 | 10/2002 | Kirsch et al. |
| 6,505,230 | B1 | 1/2003 | Mohan et al. |
| 6,532,493 | B1 | 3/2003 | Aviani et al. |
| 6,567,857 | B1 | 5/2003 | Gupta et al. |
| 6,591,305 | B2 | 7/2003 | Densmore |
| 6,748,385 | B1 | 6/2004 | Rodkin et al. |
| 6,826,594 | B1 | 11/2004 | Pettersen |
| 7,047,485 | B1 | 5/2006 | Klein et al. |
| 7,487,539 | B2 * | 2/2009 | Ramachandran et al. ...... 726/10 |
| 2002/0007393 | A1 | 1/2002 | Hamel |
| 2002/0083342 | A1 | 6/2002 | Webb et al. |
| 2002/0133549 | A1 | 9/2002 | Warrier et al. |
| 2002/0174174 | A1 | 11/2002 | Ramraj et al. |
| 2003/0051161 | A1 | 3/2003 | Smith et al. |
| 2003/0065791 | A1 | 4/2003 | Garg et al. |

FOREIGN PATENT DOCUMENTS

| | | |
|---|---|---|
| EP | 0 967 765 A2 | 2/1999 |
| EP | 1 039 396 A2 | 9/2000 |
| WO | WO 99/66385 | 12/1999 |
| WO | WO 00/11832 | 3/2000 |

OTHER PUBLICATIONS

NetMind, "Products: Tracking," Information Datasheet, Netmind, http://www.netmind.com/html/products_tracking,html, downloaded Jul. 4, 2000, pp. 1-2.

NetMind, "Company: Technology," Information Datasheet, Netmind, http://www.netmind.com/html/technology.html, downloaded Jul. 4, 2000, pp. 1-2.

Yahoo! Companion, "What is the Stock Market Toolbar?," Information Datasheet, Yahoo! Inc., http://docs.companion.yahoo.com/companion/learnmore_s_companion.html, downloaded Nov. 3, 2000, pp. 1-6.

Yahoo! Companion, "What is Yahoo! Companion?," Information Datasheet, Yahoo! Inc., http://docs.companion.yahoo.com/companion/learnmore_companion.html, downloaded Nov. 3, 2000, pp. 1-4.

Yahoo! Companion, "Yahoo! Content and features on your browser!," Information Datasheet, Yahoo! Inc., http://edit.yahoo./com/config/download_companion, downloaded Nov. 3, 2000, p. 1.

Third Voice, Service Information, thirdvoice, Inc., http://www.thirdvoice.com/, downloaded Sep. 4, 2000, pp. 1-3.

Netmind, "Webmaster: Your Web Site Essentials," Information Datasheet, Netmind, http://www.netmind.com/html/webmasters.html, downloaded Sep. 4, 2000, pp. 1-2.

Desktop.com, "Welcome to Desktop.com!," Information Datasheet, http://www.desktop.com, downloaded Sep. 26, 2000, p. 1.

Desktop.com, "Desktop.com Solutions," Information Datasheet, http://desktop.com/app/home/show/solutions/solutions.html, downloaded Sep. 26, 2000, pp. 1-2.

Desktop.com, "Company-About Us," Information Datasheet, http://www.desktop.com/static/home/products.html, downloaded Sep. 4, 2000, p. 1.

Desktop.com, "Company-Products," Information Datasheet, http://www.desktop.com/static/home/products.html, downloaded Sep. 4, 2000, pp. 1-2.

Google, How to Google, "Why use Google?,", Information Datasheet, Google Inc., http://www.google.com/why_use.html, downloaded Sep. 4, 2000, pp. 1-3.

Google, Business Development, "Google's advanced search Features," Information Datasheet, Google Inc., http:www.google.com/adv_features.html, downloaded Sep. 4, 2000, pp. 1-2.

Anonymizer.com, Online Privacy Services, Information Datasheet, http://www.anonymizer.com/, downloaded Sep. 26, 2000, p. 1.

Anonymizer.com, Online Privacy Services, Information Datasheet, http://www.anonymizer.com/services/index.shtml, downloaded Sep. 26, 2000, pp. 1-4.

Third Voice, "Meet your Web Assistant," Information Datasheet, thirdvoice, inc., http://www.thirdvoice.com/whatIs/index.htm, downloaded Sep. 26, 2000, pp. 1-3.

AltaVista, "Translations," Information Datasheet, AltaVista Company, http://babelfish.altavista.com/translate.dyn, downloaded Sep. 4, 2000, p. 1.

"My AltaVista: How to Use Babel Fish-What is AltaVista Babel Fish?" Information Datasheet, AltaVista Company, http://live.altavista.com/s?spage=help/bf_what.htm, downloaded Sep. 4, 2000, pp. 1-2.

Ray Hunt, "Internet/Intranet Firewall Security—Policy, Architecture and Transaction Services," Computer Communications, Butterworths and Co. Publishers Ltd., GB, vol. 21, No. 13, Sep. 1, 1998, pp. 1107-1123.

Barrett et al., "Intermediaries: new places for producing and manipulating Web content," Computer Networks and ISDN Systems 30 (1998), pp. 509-518.

Eich, Brendan et al., Netscape Navigator, Netscape Navigation Corporation, 1996, Mountain View, CA, pp. 24, 210.

Raggett, D.: HTML 3.2 Reference Specification. W3C Recommendation; Jan. 1997; http://www.w3.org/TR/REC-html32, 49 pages.

Sun Microsystems: The Applet Tag; http://java.sun.com/i2se/1.4.2/docs/guide/misc/applet.html, 3 pages.

The Microsoft Computer Dictionary. $5^{th}$ ed. Redmond, WA: Microsoft Press. May 1, 2002, p. 474.

Campione et al., "The Java Tutorial: Object-Oriented Programming for the Internet", Addison-Wesley, 1997, <http://journals.ecs.soton.ac.uk/java/tutorial/applet/overview/html.html>, 3 pages.

* cited by examiner

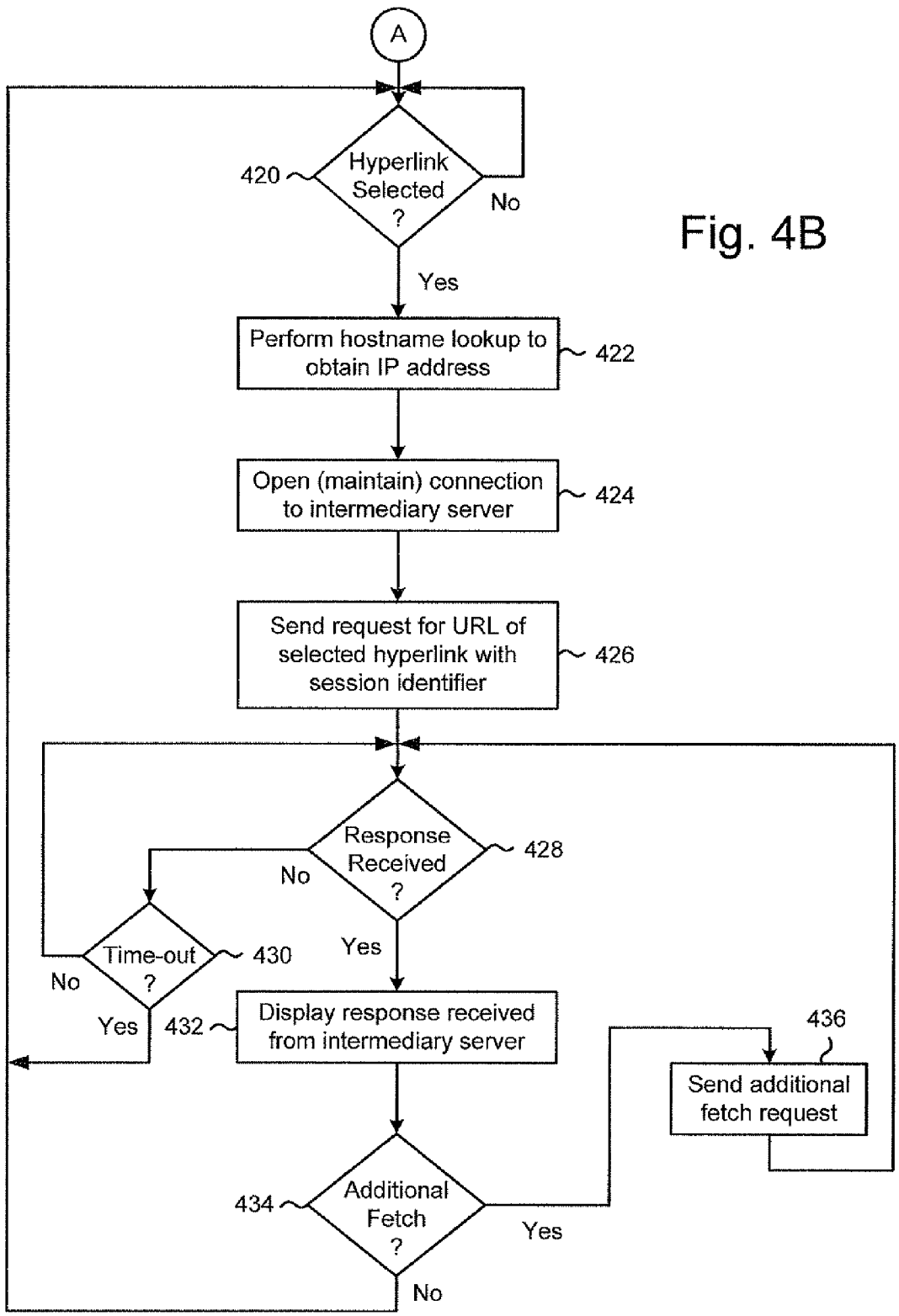

METHOD AND SYSTEM FOR MODIFYING REQUESTS FOR REMOTE RESOURCES

CROSS-REFERENCE TO RELATED APPLICATION

This application is a continuation of U.S. patent application Ser. No. 09/706,182 filed Nov. 3, 2000 now U.S. Pat. No. 7,085,817, which claims the benefit of U.S. Provisional Patent Application No. 60/235,513, filed Sep. 26, 2000 which is incorporated by reference herein.

BACKGROUND OF THE INVENTION

1. Field of the Invention

The present invention relates to client-server computing and, more particularly, to client-server computing for accessing resources over a network.

2. Description of the Related Art

Network browsers (browser applications), such as Netscape Navigator or Microsoft Explorer, allow users of client machines to request and retrieve resources from remotely located server machines via the Internet. These network browsers can display or render HyperText Markup Language (HTML) documents provided by the remotely located server machines. Additionally, browsers are able to execute script programs embedded in the HTML documents to provide some local functionality. More recent network browsers support a searchable history list, a favorites or bookmarks list, etc.

Although traditional network browsers are very useful, there is a need to provide users of network browsers with access to increased functionality and services. Generally, increased functionality and services can be provided to network browsers by (i) functionality built into network browsers, (ii) services provided by plug-in software, or (iii) web based services.

Functionality can be built into network browsers. However, because network browsers are designed for general, local use, only general functions get incorporated into network browsers. Examples of built-in functionality include a searchable history list, a favorites or bookmarks list, etc. which are provided in more recent network browsers.

Various specific browser enhancements can be provided (typically, via third parties) by software plug-ins that modify the network browser. As such, to make use of these enhancements, special purpose plug-in software needs to be downloaded to and installed on a client machine. Having to download software to obtain an enhancement is burdensome and often discourages users from obtaining the enhancement. Examples of plug-ins include LiquidAudio Media Player which allows audio sound files to be played, ThirdVoice.com which facilitates a browser companion service that allows users to add comments to any webpage, etc.

There is a growing trend to move services and functionality to the Internet (World Wide Web) and to provide access to these services through a simple network browser. As such, building functionality into network browsers or providing plug-ins are not desirable approaches. Although web-based services are desirable for this trend, various companies have developed their own server-side architecture to enable their web-based services. Examples of some web based services include: anonymizer.com which provides anonymity by routing requests through their website; netmind.com which allows monitoring for changes to web pages; and desktop.com which provides a web desktop (a portable web space). While these websites may be able to normally provide support for their services, they do so with a special purpose server-side design and do not provide a consistent or generally useful platform for supporting a wide range of services.

Thus, there is a need for providing a web-based platform that is capable of supporting a wide range of services.

SUMMARY OF THE INVENTION

The invention pertains to techniques for modifying requests or browser viewable documents (e.g., markup language documents). By modifying requests or browser viewable documents, access to resources residing on remote servers through an intermediate server is facilitated. In one embodiment, Universal Resource Locators (URLs) associated with requests or markup language documents are modified. The techniques are suitable for both secure and unsecure requests. The techniques can also modify requests or browser viewable documents at the intermediate server, a client device, or both.

The invention can be implemented in numerous ways, including as a system, method, device, and a computer readable medium. Several embodiments of the invention are discussed below.

As a method for processing a request at a first server to form a modified request that is directed to a second server, the first and second servers being coupled to a network, one embodiment of the invention includes the acts of: identifying an initial hostname portion of the request, the hostname portion initially resolves to a network address associated with the first server; determining a replacement hostname portion for the request, the replacement hostname portion resolves to a network address associated with the second server; and forming the modified request by modifying the request based on the replacement hostname portion.

As a method for modifying a markup language document to facilitate access to other resources residing on remote servers through an intermediate server, one embodiment of the invention includes the acts of: receiving, at the intermediate server, the markup language document, the markup language document including at least one link to another resource; and modifying the at least one link of the markup language document to link to the intermediary server.

As a computer readable medium including at least computer program code for modifying a browser viewable document to facilitate access to other resources residing on remote servers through an intermediate server, one embodiment of the invention includes as least: computer program code configured to receive the browser viewable document, the browser viewable document including at least one link to another resource; and computer program code configured to modify the at least one link of the browser viewable document to link to the intermediary server.

As a method for modifying Universal Resource Locators (URLs) in a browser viewable document, one embodiment of the invention includes at least the acts of: identifying a URL in the browser viewable document; determining whether the URL includes an initial hostname; and modifying the initial hostname of the URL to a predetermined hostname with the initial hostname being a subdomain to the predetermined hostname.

As a method for modifying Universal Resource Locators (URLs) in a browser viewable document, one embodiment of the invention includes at least the acts of: identifying a URL in the browser viewable document; determining whether the URL includes an initial hostname; and replacing the initial hostname of the URL with a predetermined hostname when the determining determines that the URL includes the initial hostname.

As a method for modifying target Universal Resource Locators (URLs) in a browser viewable document being identified by a source URL, one embodiment of the invention includes at least the acts of: identifying a target URL in the browser viewable document; first determining whether the target URL includes an initial hostname; second determining whether the source URL has an appended hostname or port information associated therewith; and appending the hostname or port information associated with the source URL to the target URL when both the first determining determines that the target URL does not include the initial hostname and the second determining determines that the source URL has an appended hostname or port information associated therewith.

As a method for modifying Universal Resource Locators (URLs) in a browser viewable document, one embodiment of the invention includes at least the acts of: identifying a URL in the browser viewable document; first determining whether the URL includes an initial hostname; second determining whether the URL is associated with a secure request; modifying the initial hostname of the URL in a first manner when the first determining determines that the URL includes the initial hostname and the second determining determines that the URL is not associated with a secure request; and modifying the initial hostname of the URL in a second manner when the first determining determines that the URL includes the initial hostname and the second determining determines that the URL is associated with a secure request, the second manner being different from the first manner.

As a method for modifying a markup language document to facilitate access to other markup language documents through an intermediary server, one embodiment of the invention includes at least the acts of: receiving, at the intermediary server, a first markup language document from a remote server; locating hostnames within certain predetermined tags of the first markup language document; and modifying the located hostnames within the first markup language document in accordance with a hostname associated with the intermediary server.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 4A and 4B are flow diagrams of client processing according to one embodiment of the invention;

DETAILED DESCRIPTION OF THE INVENTION

The invention pertains to techniques for modifying requests or browser viewable documents (e.g., markup language documents). By modifying requests or browser viewable documents access to resources residing on remote servers through an intermediate server is facilitated. In one embodiment, Universal Resource Locators (URLs) associated with requests or markup language documents are modified. The techniques are suitable for both secure and unsecure requests. The techniques can also modify requests or browser viewable documents at the intermediate server, a client device, or both.

Embodiments of this aspect of the invention are discussed below with reference to FIGS. 1-12B. However, those skilled in the art will readily appreciate that the detailed description given herein with respect to these figures is for explanatory purposes as the invention extends beyond these limited embodiments.

Figure 1:
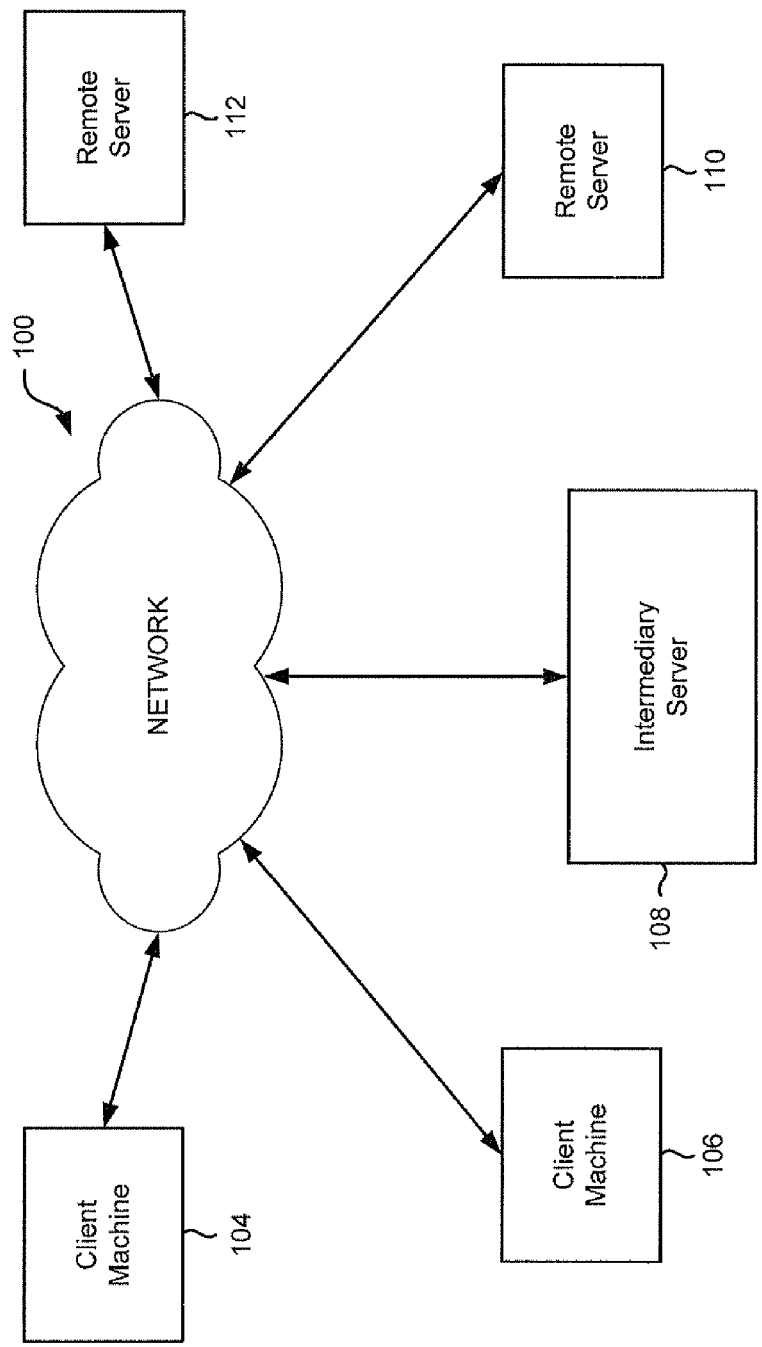
FIG. 1 is a block diagram of an information retrieval system according to one embodiment of the invention.

FIG. 1 is a block diagram of an information retrieval system 100 according to one embodiment of the invention. The information retrieval system 100 includes a network 102, client machines 104 and 106, an intermediary server 108, and remote servers 110 and 112. The network 102 serves as a communication medium through which the client machines 104 and 106, the intermediary server 108 and the remote servers 110 and 112 can communicate. The network 102 is, for example, a data network which can include the Internet, a wide area network, or a local area network. The Internet refers to a global network of interconnected computers.

According to the invention, requests for content residing on the remote servers 110 and 112 can be received from the client machines 104 and 106. As used herein "content" is any information or resource that can be stored on a server and retrieved by a client. Typically, the content is embodied as an electronic file and contains text and/or images. Often the client machines 104 and 106 operate browser applications that facilitate requesting and retrieval of content over the network 102. In such case, the content is often returned to the browser application as a browser viewable document (e.g., markup language document, webpage, etc.) so that the browser application can display the same. Instead of the client machines 104 and 106 directly accessing the remote servers 110 and 112 through the network 102, the client machines 104 and 106 communicate with an intermediary server 108. The intermediary server 108 then, in turn, accesses the remote servers 110 and 112 on behalf of the client machines 104 and 106. Once the intermediary server 108 obtains the requested content from the remote servers 110 and 112, the intermediary server 108 can directly return the requested content to the client machines 104 and 106 or can first modify the requested content and then deliver it to the client machines 104 and 106.

The modification to the requested content by the intermediary server 108 can take a variety of forms. As one example, the intermediary server 108 can insert a toolbar into the requested content before delivery to the client machines 104 and 106. As another example, the intermediary server 108 can alter the hyperlinks within the requested content so as to point to an intermediary server (e.g., the intermediary server 108). Various other tasks can be performed on the requested content by the intermediary server 108.

Additionally, the information retrieval system 100 can also support centralized storage at the intermediary server 108 of server stored information as well as previously requested content. The server stored information is often referred to as "cookies", though cookies are conventionally stored on client machines. The centralized storage of the previously requested content at the intermediary server 108 can provide a history of content previously requested and returned to client machines. The history can then be later retraced, searched, etc. to locate previously retrieved content.

Although the information retrieval system 100 illustrated in FIG. 1 depicts only a pair of client machines, a pair of remote servers and a single intermediary server, it should be understood that the information retrieval system 100 can support many client machines and many server machines. It should also be understood that the information retrieval system 100 can also support multiple intermediary servers.

Figure 2A:
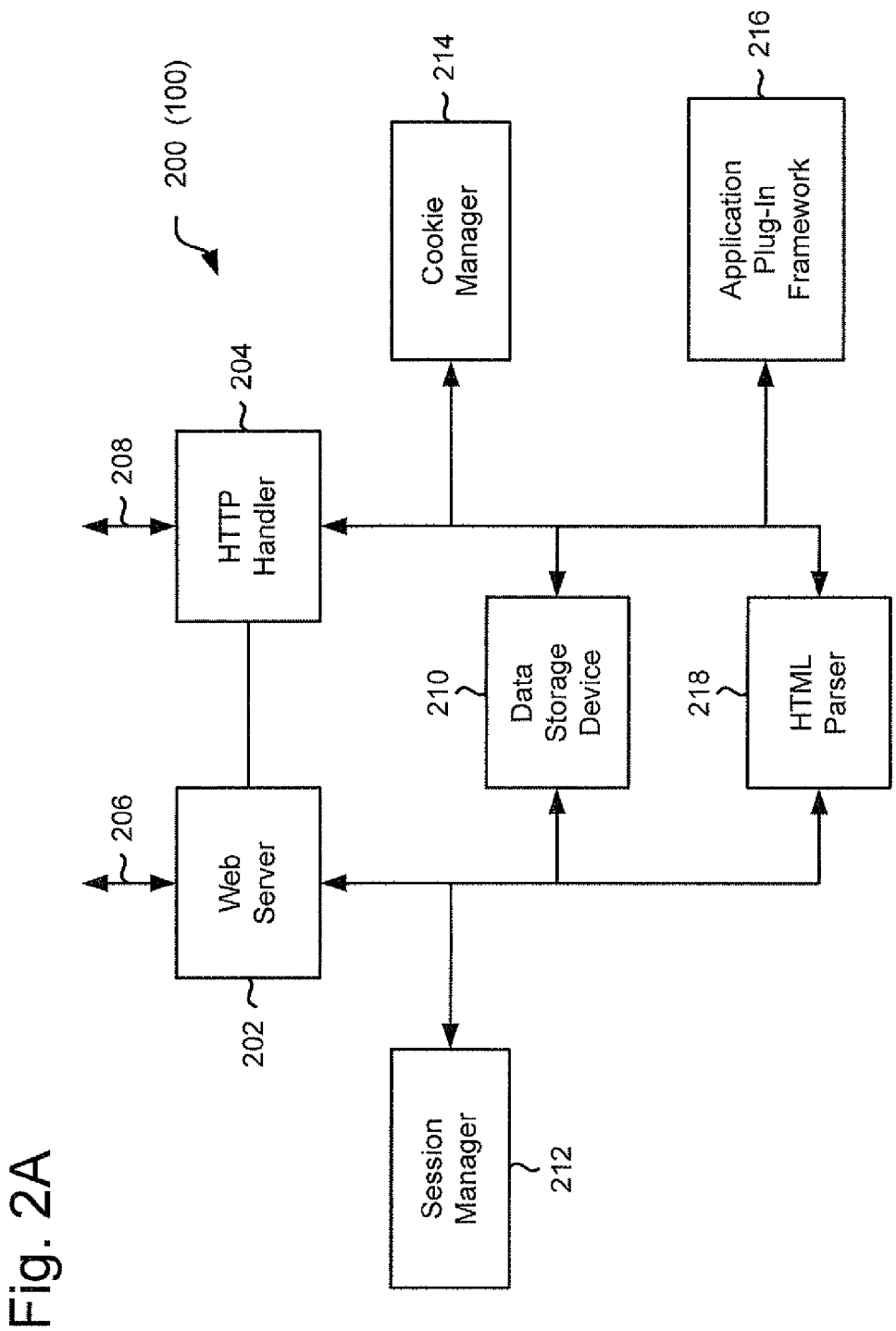
FIG. 2A is a block diagram of an intermediary server according to one embodiment of the invention.

FIG. 2A is a block diagram of an intermediary server 200 according to one embodiment of the invention. The intermediary server 200 is, for example, suitable for use as the intermediary server 108 illustrated in FIG. 1.

The intermediary server 200 includes various processing modules typically implemented by computer program code executed by a processing device utilized by the intermediary server. More particularly, the processing modules of the intermediary server 200 include a web server 202 and a HyperText Transfer Protocol (HTTP) handler 204. The web server 202 couples to client machines through a link 206 (via a network) and the HTTP handler 204 couples to remote servers through a link 208 (via a network). The web server 202 and the HTTP handler 204 also communicate with one another as well as with various supporting modules and a data storage device 210. The data storage device 210 provides persistent or non-volatile storage for various data items being maintained by the intermediary server 200. Typically, for each user or requestor associated with a client machine, the data storage device provides separate storage.

The supporting modules include a session manager 212 that manages a communication session between a client machine and the intermediary server 200 as well as between the intermediary server 200 and a remote server. A cookie manager 214 manages "cookies" such that those being received from a remote server are stored to the data storage device 210 and those "cookies" previously stored in the data storage device 210 are delivered to the remote server at appropriate times. More generally, "cookies" refer to server stored information. Such server stored information is often set by a remote server and used for session, state or identification purposes. An application plug-in framework 216 provides support for plug-in modules that provide additional functionality to the intermediary server 200. The plug-in modules can perform a variety of different types of functions and thus provide clients or servers with additional functions or features. The plug-in modules can also be developed by third-parties which can then take advantage of the infrastructure provided by the intermediary server 200 and the information retrieval system 100. The intermediary server 200 also includes an HTML parser 218 which is a processing module that is used to parse requested content received from a remote server and then modify the content (e.g., HTML content) in predetermined ways.

Figure 2B:
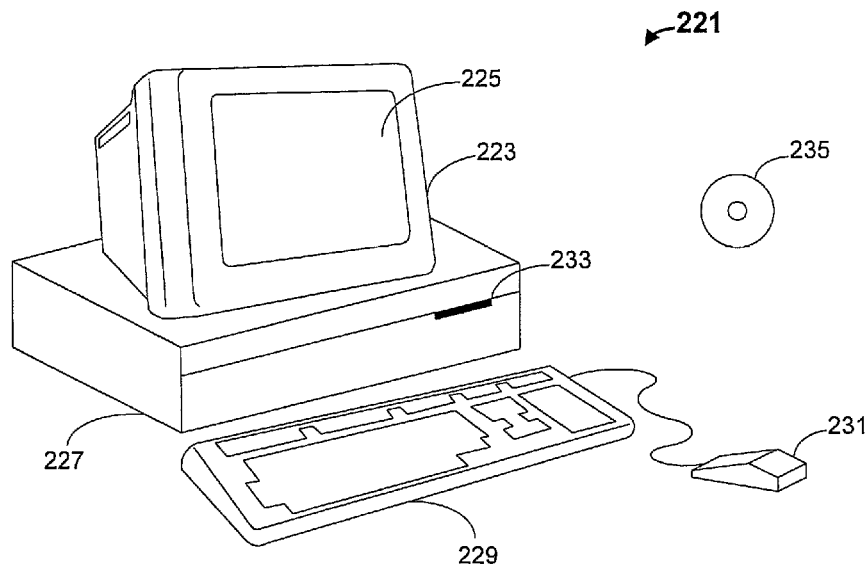
FIGS. 2B and 2C illustrate an example of a computer system that may be used in accordance with the invention.
Figure 2C:
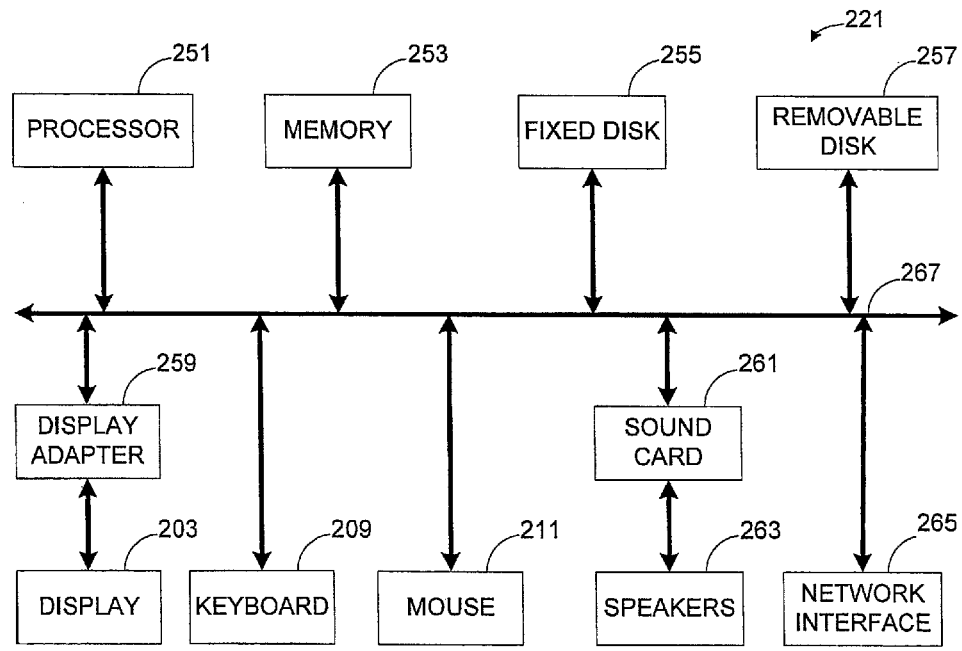

FIGS. 2B and 2C illustrate an example of a computer system that may be used in accordance with the invention. The computer system can, for example, correspond to any of the client machines 104 and 106, the intermediary server 108, or the remote servers 110 and 112. FIG. 2B shows a computer system 221 that includes a display 223, screen 225, cabinet 227, keyboard 229, and mouse 231. Mouse 231 may have one or more buttons for interacting with a graphical user interface. The cabinet 227 houses a removable medium (e.g., CD-ROM) drive 233, system memory and a hard drive (see FIG. 2C) which may be utilized to store and retrieve software programs incorporating computer code that implements the invention, data for use with the invention, and the like. Although CD-ROM 235 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium. In one implementation, an operating system for the computer system 221 is provided in the system memory, the hard drive, the CD-ROM 235 or other computer readable storage medium and serves to incorporate the computer code that implements the invention.

FIG. 2C shows a system block diagram of the computer system 221 used to perform the processing of an embodiment of the invention. As in FIG. 2C, the computer system 221 includes monitor 223 and keyboard 229, and mouse 231. The computer system 221 further includes subsystems such as a central processor 251, system memory 253, fixed storage 255 (e.g., hard drive), removable storage 257 (e.g., CD-ROM disk), display adapter 259, sound card 261, speakers 263, and network interface 265. The central processor 251, for example, can execute computer program code (e.g., an operating system) to implement the invention. An operating system is normally, but necessarily, resident in the system memory 253 during its execution. Other computer systems suitable for use with the invention may include additional or fewer subsystems. For example, another computer system could include more than one processor 251 (i.e., a multi-processor system) or a cache memory.

The system bus architecture of computer system 221 is represented by arrows 267. However, these arrows are illustrative of any interconnection scheme serving to link the subsystems. For example, a local bus could be utilized to connect the central processor to the system memory and display adapter. The computer system 221 shown in FIG. 28 is but an example of a computer system suitable for use with the invention. Other computer architectures having different configurations of subsystems may also be utilized.

Figure 3:
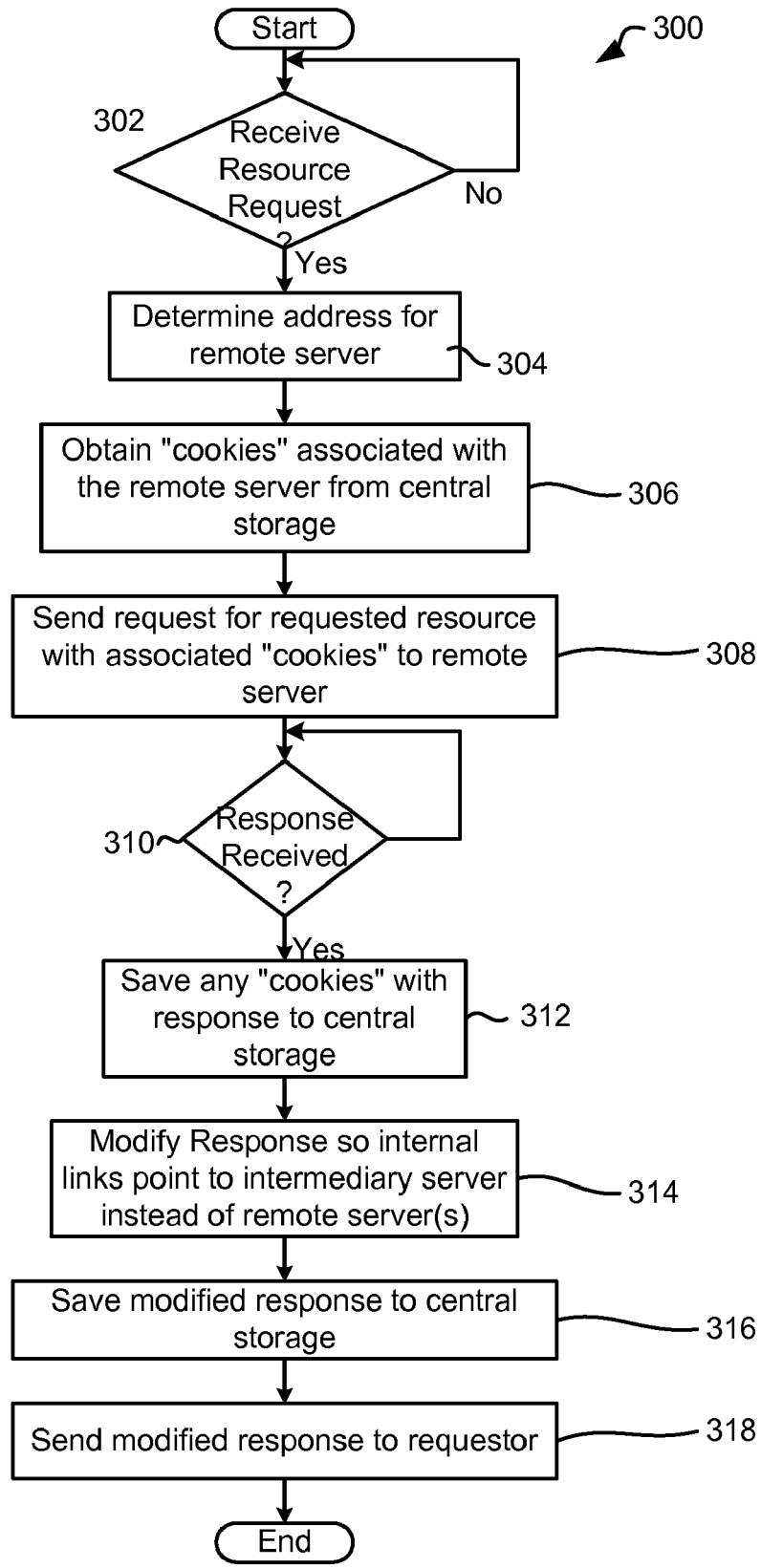
FIG. 3 is a flow diagram of intermediary request processing according to one embodiment of the invention.

FIG. 3 is a flow diagram of intermediary request processing 300 according to one embodiment of the invention. The intermediary request processing 300 is, for example, performed by the intermediary server 108 illustrated in FIG. 1.

The intermediary request processing 300 begins with a decision 302 that determines whether a resource request has been received from a client machine. When the decision 302 determines that a resource request has not yet been received, then the intermediary request processing 300 awaits such a request. Once the decision 302 determines that a resource request has been received, then an address for the remote server having the requested resource is determined 304. The address is determined 304 from at least the resource request that has been received. Next, "cookies" (server stored information) associated with the remote server are obtained 306 from central storage. Typically, the "cookies" are maintained in the central storage by the intermediary server in a manner that associates the "cookies" with the requester or user as well as the remote server. Then, a request for the requested resource with the associated "cookies" are sent 308 to the remote server.

At this point, the intermediary request processing 300 awaits a response to the request. In particular, a decision 310 determines whether a response has been received. When the decision 310 determines that a response has not yet been received, the intermediary request processing 300 awaits such a response. Once the decision 310 determines that a response has been received, then any "cookies" provided with the response are saved 312 to the central storage. Again, the "cookies" are preferably stored in the central storage such that they are associated with not only the user or requester but also the remote server.

Next, the response is modified 314 so that internal links point to the intermediary server instead of one or more remote servers. After the response has been modified 314, the modified response is saved 316 to the central storage. By saving the modified response, a historical database of accessed resources can be maintained for the user or requester and thus enabling subsequent retrieval of previously viewed resources. In an alternative embodiment, the unmodified response can be saved 316 to the central storage. The modified response is then sent 318 to the requester. At this point, the user or requester has received the response initially requested, though the response has been modified. By modifying the response, the intermediary server is able to insert itself between the client and remote server so as to provide the user with an enhanced environment for accessing remote resources. After the modified response is sent 318 to the requester, the intermediary request processing 300 is complete and ends.

Figure 4A:
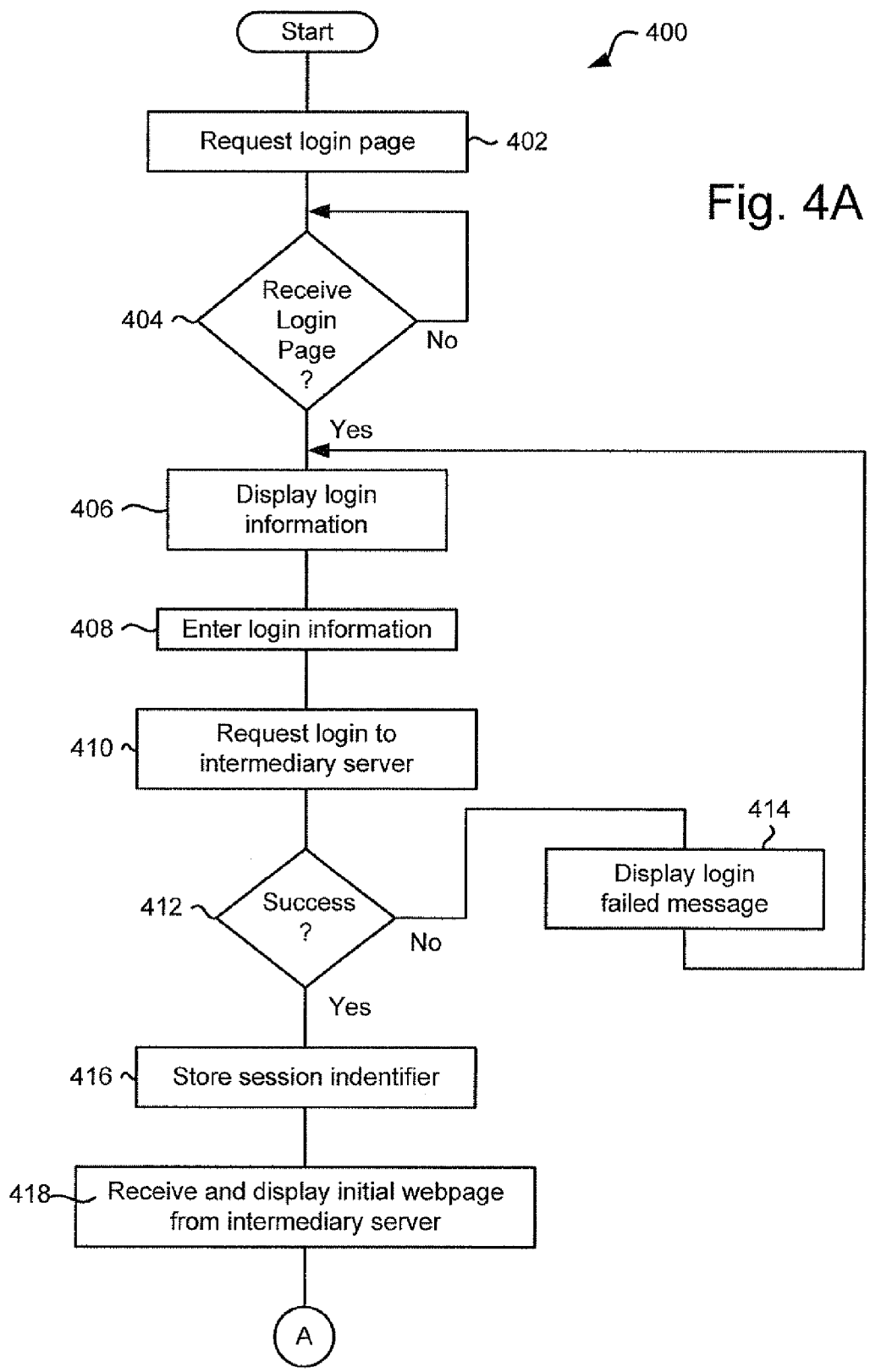

FIGS. 4A and 4B are flow diagrams of client processing 400 according to one embodiment of the invention. The client processing 400 is, for example, performed by a client machine, such as the client machine 104 or the client machine 106 illustrated in FIG. 1. The client processing 400 can be considered as having two portions, a first portion representing an initial client processing illustrated in FIG. 4A and a second portion representing page request client processing illustrated in FIG. 4B.

The client processing 400 initially begins by a user interacting with a client machine to request 402 a login page. The login page is utilized to permit a user interacting with the client machine to log onto an intermediary server so that the intermediary server can confirm that the user is an authorized user. After the login page is requested 402, a decision 404 determines whether the login page has been received. Here, the client processing 400 awaits the receipt of the login page from the intermediary server. When the decision 404 determines that the login page has not yet been received, the client processing 400 awaits receipt of the login page. Once the decision 404 determines that the login page has been received, the login page is displayed 406. Here, the login page can be presented to a user on a display screen associated with the client machine. Once the login page is displayed 406, a user can enter login information 408. For example, the login page is typically displayed by a browser application that allows a user to enter information into the login page through use of a keyboard and/or pointing device. Next, a login to the intermediary server is requested 410.

A decision 412 then determines whether the client processing 400 has been notified of the successful login by the intermediary server. When the decision 412 determines that the login request has been declined by the intermediary server, then a login failed message is displayed 414. Thereafter, the client processing 400 can return to repeat the operation 406 and subsequent operations so that the login can be again attempted. On the other hand, when the decision 412 determines that the login request has been successful, a session identifier that has been returned from the intermediary server is stored 416. Here, the session identifier is stored (e.g., as a "cookie") on the client machine. Next, an initial webpage from the intermediary server is received and displayed 418.

The characteristics of the initial webpage are that at least some of the hyperlinks embedded therein are initially directed to the intermediary server instead of a remote server that hosts the content (resources) associated with the hyperlink. At this point, a user (or requester) can select hyperlinks provided on the displayed webpage from the intermediary server. Further discussion below assumes that the hyperlinks of interest are all directed to the intermediary server instead of to remote servers where their content resides.

A decision 420 then determines whether a hyperlink on the displayed webpage has been selected 420. When the decision 420 determines that a hyperlink has not been selected, the client processing 400 awaits such a selection. Once the decision 420 determines that a hyperlink has been selected, the client processing 400 continues. A host name lookup is performed 422 to obtain the Internet Protocol (IP) address associated with the selected hyperlink. Typically, a Domain Name Service (DNS) server associated with the Internet is used to obtain the IP address. Next, a connection is opened (or maintained if already opened) between the client machine and the intermediary server. The connection can utilize security measures such as Secure Sockets Layer (SSL) if desired. A request for a URL associated with the selected hyperlink together with the session identifier are then sent 426 to the intermediary server. The URL identifies the content (resource) on a remote server being requested by the selected hyperlink.

Next, a decision 428 determines whether a response has been received from the intermediary server. When the decision 428 determines that a response has not yet been received, a decision 430 determines whether a time-out has occurred. When the decision 430 determines that a time-out has occurred, then the client processing 400 returns to repeat the operation 420 and subsequent operations because the previous request for content associated with selected hyperlink was not successful. Alternatively, when the decision 430 determines that a time-out has not yet occurred, then the client processing 400 returns to repeat the decision 428 so as to continue to wait for the receipt of the response from the intermediary server.

On the other hand, when the decision 428 determines that a response has been received, then the response received from the intermediary server is displayed 432. In addition, a decision 434 determines whether there are additional fetches of content to be performed in fully rendering the response. For example, responses (e.g., such as web pages) often include source links for additional content, such as graphics or advertisements, that are obtained by additional fetches (requests). Hence, when the decision 434 determines that there are additional fetches to be made, then an additional fetch request is sent 436 to the intermediary server. Thereafter, the client processing returns to repeat the operation 428 and subsequent operations. On the other hand, when the decision 434 determines that there are no additional fetches to be made, then the client processing 400 returns to repeat the operation 420 and subsequent operations so that additional hyperlink selections can be processed. The client processing 400 ends when the session ends which can occur through stopping the browser application, shutting down or restart of the client machine, or due to prolonged inactivity.

FIGS. 5A-5D are flow diagrams of intermediary processing 500 according to one embodiment of the invention. The intermediary processing 500 is, for example, performed by an intermediary server, such as the intermediary server 108 illustrated in FIG. 1.

The intermediary processing 500 begins with a decision 502 that determines whether a connection request has been received. When the decision 502 determines that a connection request has been received, a connection is established 504 (or maintained if previously existing) with the requester (client machine). The connection can be either a secure connection or an unsecure connection. For example, in the case of a secure connection, in one embodiment, a SSL handshake can be performed to exchange encryption related information. Following operation 504, the intermediary processing 500 returns to repeat the decision 502 so that a subsequent request can be processed. On the other hand, when the decision 502 determines that a connection request has not been received, then a decision 506 determines whether a URL request has been received. When the decision 506 determines that a URL request has not been received, then the intermediary processing 500 returns to repeat the decision 502 and subsequent operations.

Alternatively, when the decision 506 determines that a URL request has been received, then the intermediary processing 500 determines the type of URL being requested. In general, the URL can be associated with a remote server (remote URL) or the intermediary server (local URL). In this embodiment of the intermediary processing 500 it is assumed that a login page and a view history search page are available from the intermediary server and that various other URLs are available from remote servers. However, it should be recognized that the intermediary server can support various additional pages in a similar fashion.

More particularly, when the decision 506 determines that a URL request has been received, then a decision 508 determines whether the URL request is a login page request from a requester. In this embodiment, the requestor is assumed to be a client machine, though the requestor could also be a user of the client machine alone or in combination with the client machine. When the decision 508 determines that a login page request has been received, the login page is sent 510 to the requestor. Following the operation 510, the intermediary processing 500 returns to repeat the decision 502 and subsequent operations.

Alternatively, when the decision 508 determines that a login page request has not been received, a decision 512 determines whether the session is authorized. When the decision 512 determines that the session is not authorized, then the intermediary processing 500 returns to repeat the operation 510 and subsequent operations so that the requester can be forced to login and thus establish an authorized session before any (non-login) URL requests are processed. On the other hand, when the decision 512 determines that the session is authorized, then a decision 514 determines whether the URL request is a view history request. When the decision 514 determines that the URL request is a view history request, then a view history search page is sent 515 to the requester. Following the operation 5151 the intermediary processing 500 returns to repeat the decision 502 and subsequent operations. Alternatively, when the decision 514 determines that the URL request is not a view history request, then the intermediary processing 500 assumes that the URL requested is a remote URL request for content (resource) (e.g., web page) at a remote server and thus not a local URL request.

The intermediary processing 500 then continues for the remote URL request with preprocessing of the URL request. Initially, a decision 516 determines whether the URL request is a secure request. When the decision 516 determines that the URL request is not a secure request (i.e., an unsecure request), then the host name associated with the request is modified 518 to remove the intermediary name. Then, a host name lookup is performed 520 to obtain an IP address of the appropriate remote server. A connection is then opened 522 (or maintained if already opened) to the remote server. Next, "cookies" associated with the modified host name are obtained 524. At this point, the intermediary server has completed preprocessing of the URL request and is prepared to now forward the request to the remote server.

Alternatively, when the decision 516 determines that the URL request is a secure request, the preprocessing of the URL request by the intermediary server is performed differently. Initially, the host name for the appropriate remote server is obtained 526. In one embodiment, the host name can be obtained 526 from storage. Here, the storage can, for example, by the data storage device 210 illustrated in FIG. 2. In another embodiment, the host name can be obtained 526 from the URL request. After the host name for the appropriate remote server is obtained 526, a host name lookup is performed 528 to obtain an IP address of the appropriate remote server. A connection is then opened 530 (or maintained if already opened) to the remote server. Next, a secure handshake is performed 532 between the intermediary server and the remote server as needed. The "cookies" associated with the obtained host name are then obtained 534. Following the operation 534' the preprocessing of the URL request at the intermediary server is completed and the request is now able to be forwarded to the remote server.

At this point, regardless of whether processing a secure or unsecure URL request, the request for the URL with associated "cookies" is sent 536 to the remote server. A decision 538 then determines whether a response has been received. When the decision 538 determines that a response has not yet been received, the intermediary processing 500 awaits such a response. Once the decision 538 determines that a response has been received, then a decision 540 determines whether "cookies" are present in the response. When the decision 540 determines that "cookies" are present in the response, then the "cookies" are extracted 542 from the response. The extracted "cookies" are then saved 544. Typically, the "cookies" are stored in central storage provided within or associated to the intermediary server. Following the operation 544, as well as following the decision 540 when it is determined that "cookies" are not present in the response, then a host name portion of any URLs within headers of the response are modified 546.

A decision 548 then determines whether the response is a HTML response. Here, in general, a response can be of a variety of forms such as HTML, graphics, .pdf, MPEG, or other various formats. When the decision 548 determines that the response is not a HTML response, then the response can be immediately sent (or forwarded) 550 to the requestor. Then, a decision 552 determines whether the response is completed. When the decision 522 determines that the response is completed, then the intermediary processing 500 returns to repeat the decision 502 and subsequent operations so that additional requests can be processed. On the other hand, when the decision 552 determines that so far only a portion of the response has been sent to the requestor, then the intermediary processing 500 returns to repeat the decision 538 and subsequent operations so that subsequent portions of the response can be similarly processed.

On the other hand, when the decision 548 determines that the response is an HTML response, then the response is processed 554 through any application plug-in(s) that are installed or present at the intermediary server. Next, the resulting HTML is saved 556 with reference to the requestor. Here, the resulting HTML is saved so that the requestor can, at a later date, retrieve previously requested HTML and thus review or search through content that has been previously requested (i.e., one's historical trail) by the requestor. Next, a toolbar HTML can be inserted 558 into the resulting HTML. The toolbar that is produced by the toolbar HTML can provide controls or content that are added to the resulting HTML so as to facilitate features or functionality provided by the intermediary server. Next, certain URLs within the resulting HTML can be modified 560. In one embodiment, the modifications 560 to the certain URLs can be achieved by modifying the host name portion of URLs within certain tags of the resulting HTML. In another embodiment, the modifications 560 to the certain URLs can be achieved by adding suffixes to the certain URLs. The suffixes thus serve to allow the URLs to carry additional information. Further, certain URLs provided or produced by scripting language portions within the resulting HTML can be modified 562. Examples of scripting languages include JavaScript and VBscript. In one embodiment, a host name portion of the certain URLs provided or produced by scripting language portions within the resulting HTML are modified 562. In another embodiment, the certain URLs provided or produced by scripting language portions are modified 562 to include suffixes which carry supplemental information. Additional details on modifying scripting language portions is provided below with reference to FIGS. 12A and 12B. Thereafter, the resulting HTML is sent 564 to the requestor.

A decision 566 then determines whether the request has been completed. When the decision 566 determines that the request has been completed, then the intermediary processing 500 returns to repeat the decision 502 and subsequent operations so that additional requests can be processed. On the other hand, when the decision 566 determines that the request is not yet completed, then the intermediary processing 500 returns to repeat the decision 538 and subsequent operations so that remaining portions of the response can be similarly processed upon being received. The intermediary processing 500 can thus operate to process a single response to a URL request in multiple pieces or blocks of data. In such case, the intermediary processing 500 can process a response from a remote server as it arrives so that responsiveness to the requester is not hindered. In to this regard, the intermediary processing 500 causes the operations 538-566 to be repeated for each piece or block of data associated with a response.

Figure 6:
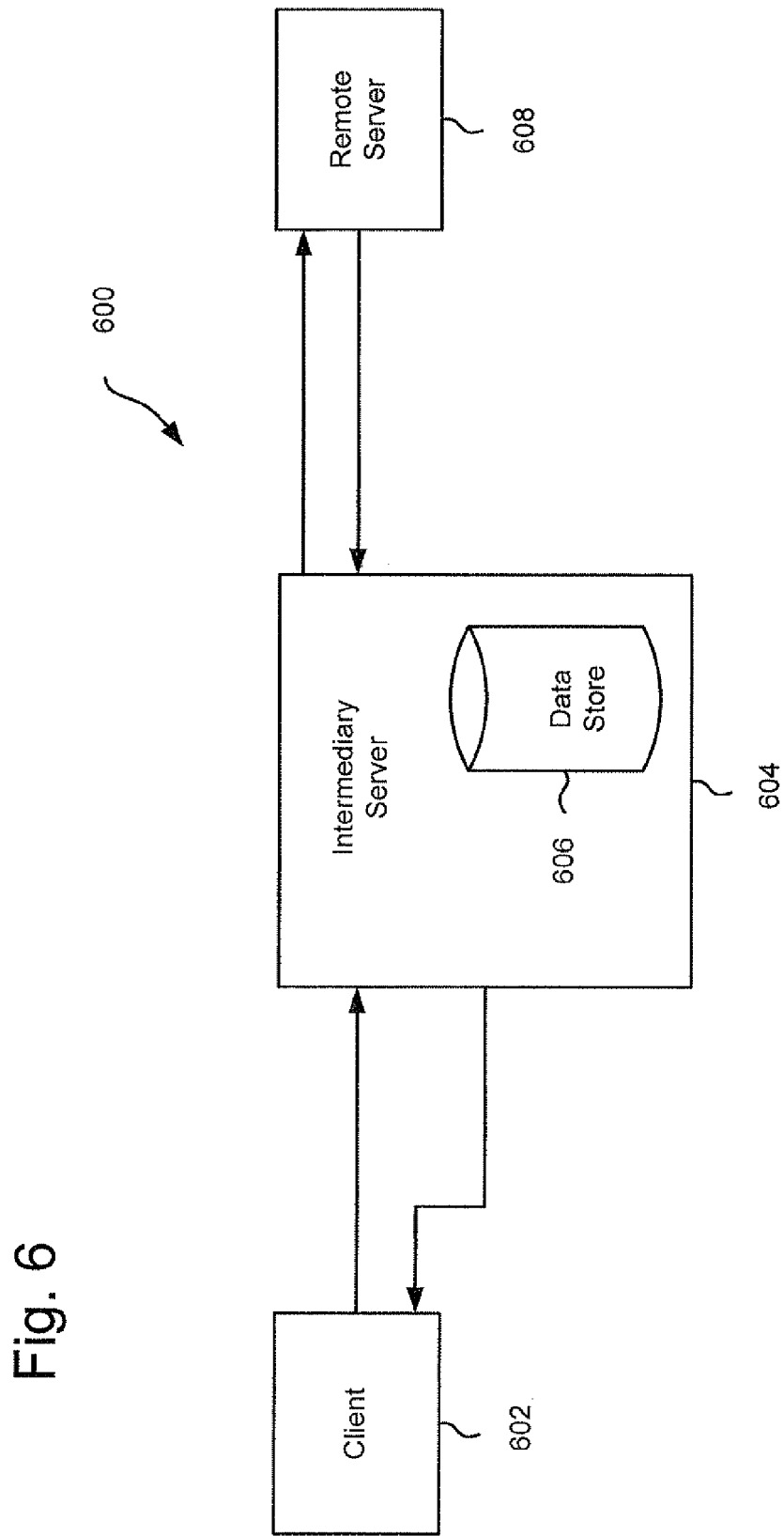
FIG. 6 illustrates a diagram of an information retrieval system according to one embodiment of the invention.

FIG. 6 illustrates a diagram of an information retrieval system 600 according to one embodiment of the invention. The information retrieval system 600 is generally similar to the information retrieval system 100 of FIG. 1. The operation of the information retrieval system 600 is discussed below with reference to three representative examples which illustrate its operation according to one embodiment. One example pertains to an unsecure request and the other examples pertains to a secure request. The information retrieval system 600 includes a client 602, an intermediary server 604 with a data store 6061 and a remote server 608. It is assumed that the initial client processing portion (e.g., FIG. 4A) has already been performed.

The first representative example pertains to an unsecure request which can be initiated by the user selecting (420) a hyperlink in a displayed webpage. The selected hyperlink is assumed to be http://www.xyz.com.danastreet.com/quote/msft where "http" is the protocol, "www.xyz.com.danastreet.com" is the hostname with "danastreet.com" being a domain and "xyz.com" being a subdomain, and "/quote/msft" being a path to the particular resource being requested by selection of the hyperlink. Hence, the domain name lookup (422) of the hostname "www.xyz.com.danastreet.com" is resolved to the IP address of danastreet.com. This can be achieved by configuring network routers to give the same IP address for any subdomain of datastreet.com. The request is then sent (426) from the client 602 to the intermediary server 604. The request is, for example, as follows:

GET: /quote/msft HTTP/1.0
Host: www.xyz.com.danastreet.com
Cookie: DSID=123xyzzbc Other information can also be included within the request such as other cookies, encoding-accepted, etc. The cookie is, in this example, a session cookie and is used in determining whether the client 602 is authorized (514) for user with the intermediary server 604.

In the case of an unsecure request, the hostname within the request is modified (518) to remove the "danastreet.com" portion and then perform a domain name lookup (520) on the modified portion (i.e., remaining portion) of the hostname ("www.xyz.com"). Any cookies in the data store 606 previously received on behalf of the user that are associated with the modified hostname are then obtained (524). Next, a request by the intermediary server 604 is sent (536) to the remote server 608. The request is, for example, as follows:

GET: /quote/msft HTTP/1.0
Host: www.xyz.com
Cookie: xyzUserID=sam

Other information can also be included within the request. Note that the cookie provided with the original request pertains to the intermediary server 604 and thus is not forwarded with the request to the remote server 608.

The remote server 608 receives the request and returns (538) a response header and some or all of the content of the requested resource. An exemplary response can have the following format:

200 OK
Set-cookie: xyzuserID=Samual, expires=01-Jul-2002
Content-type: text/html
Content-length: 2000
Location: http://www.xyz.com/stockquote/msft
<HTML>
***
</HTML>

Since the response included a "cookie" to be set, the set-cookie command is remove (542) from the response and then saved (544) in the data store 606. Next, to the extent they are present, the hostnames within the headers are modified (546) to point to the intermediary server 604. In this example, the location header includes a full path (including hostname), namely, http://www.xyz.com/stockquote/msft, which is thus modified to http://www.xyz.com.danastreet.com/stockquote/msft. For paths in the headers that do not include hostnames, no modifications are needed as the browser application operating on the client 602 will cause the current hostname ("www.xyz.com.danastreet.com") to be used for such paths. Next, processing through one or more plug-in(s) can be performed (554) to alter, modify or supplement the HTML data accompanying the response. The resulting HTML is saved (556) in the data store 606. If desired, a toolbar can be inserted (558) into the resulting HTML to facilitate operations or functions supported by the intermediary server 604. Still further certain URLs within the resulting HTML or those produced by scripting languages are modified (560, 562) to point to the intermediary server 604. For example, if the resulting HTML included the following hyperlink:

<a ref=http://www.xyz.com/quote/msft> then the hyperlink would be modified to the following.

<a ref=http://www.xyz.com.danastreet.com/quote/msft>

Additional details are provided below on the modification (560, 562) of the certain URLs within the resulting HTML or those produced by scripting languages. Thereafter, the response including the modified HTML can be delivered (564) from the intermediary server 604 to the client 602.

The second representative example pertains to a secure request which can be initiated by the user selecting (420) a hyperlink in a displayed webpage. The selected hyperlink is assumed to be https://secure.danastreet.com:700/quote/msft where "https" is the protocol which uses Secure Sockets Layer (SSL), "www.secure.danastreet.com" is the hostname with "danastreet.com" being a domain and "/secure" being a subdomain, "700" indicating a port number, and "quote/msft" being a path to the particular resource being requested by selection of the hyperlink. Hence, the domain name lookup (422) of the hostname "secure.danastreet.com" is resolved to the IP address of danastreet.com. For secure communications, the browser in making the connection to the hostname will require an authentication certificate be present for the hostname. The presence of such an authentication certificate for the matching hostname is helpful because a browser attempting such a secure connection does not alert the user of its absence (e.g., with a pop-up dialog box). Here, single certificate for "secure.danastreet.com" can be used for all secure requests. The request is then sent (426) from the client 602 to the intermediary server 604. The request is, for example, as follows:

GET: /quote/msft HTTP/1.0
Host: secure.danastreet.com:700
Cookie: DSID=123xyzzbc Other information can also be included within the request such as other cookies, encoding-accepted, etc. The cookie is, in this example, a session cookie and is used in determining whether the client 602 is authorized (514) for user with the intermediary server 604.

In the case of a secure request, the hostname within the request is not able to directly identify the remote server 608 where the request is eventually to be delivered. However, the hostname for the remote server 608 can be obtained (526) from the data storage 606. More particularly, in accordance with one embodiment, the port number and a session (or user) identifier are used to lookup in the data storage 606 the appropriate hostname. Here, the port number "700" for the client 602 is assumed to represent "xyz.com". Once the appropriate hostname has been obtained (526), a domain name lookup (528) is performed on the hostname ("www.xyz.com"). Next, a connection between the intermediary server 604 and the remote server 608 is opened (530) or maintained is already opened, and secure handshaking performed (532). Any cookies in the data store 606 previously received on behalf of the user that are associated with the hostname are then obtained (534). Next, a request by the intermediary server 604 is sent (536) to the remote server 608. The request is, for example, as follows:

GET: /quote/msft HTTP/1.0
Host: www.xyz.com
Cookie: xyzUserID=sam

Other information can also be included within the request. Note that the cookie provided with the original request pertained to the intermediary server 604 and thus is not forwarded with the request to the remote server 608.

The remote server 608 receives the request and returns (538) a response header and some or all of the content of the requested resource. An exemplary response can have the following format:

HTTP/1.0 200 OK
Set-cookie: xyzuserID=Samual, expires=01-Jul-2002
Content-type: text/html
Content-length: 2000
Location: https://www.xyz.com/stockquote/msft
<HTML>
***
</HTML>

Since the response included a "cookie" to be set, the set-cookie command is remove from the response (542) and then saved (544) in the data store 606. Next, to the extent they are present, the hostnames within the headers are modified (546) to point to the intermediary server 604. In this example, the location header includes a full path (including hostname), namely, https://www.xyz.com/stockquote/msft, which is thus modified to https://secure.danastreet.com:700/stockquote/msft. For paths in the headers that do not include hostnames, no modifications are needed as the browser application operating on the client 602 will cause the current hostname with port number ("www.secure.danastreet.com:700") to be used for such paths. Next, processing through one or more plug-in(s) can be performed (554) to alter, modify or supplement the html data accompanying the response. The resulting html is saved (556) in the data store 606. If desired, a toolbar can be inserted (558) into the resulting html to facilitate operations or functions supported by the intermediary server 604. Still further the hostname portion of URLs within certain tags within the resulting html or those produced by scripting languages are modified (560, 562) to point to the intermediary server 604. For example, if the resulting html included the following hyperlink:

<a ref=https://www.ijk.com/quote/msft> then the hyperlink would be modified to the following:

<a ref=https://secure.danastreet.com:701/quote/msft>

As another example, the resulting html could also include hyperlinks not requiring a secure connection and thus be converted as noted above in the first representative example. Additional details are provided below on the modification (560, 562) of the certain URLs within the resulting HTML or those produced by scripting languages. Thereafter, the response including the modified HTML can be delivered (564) from the intermediary server 604 to the client 602.

The third representative example pertains to a secure request which can be initiated by the user selecting (420) a hyperlink in a displayed webpage. The selected hyperlink is assumed to be https://secure.danastreet.com/quote/msft:danainfo:
host=www.xyz.com where "https" is the protocol which uses Secure Sockets Layer (SSL), "secure.danastreet.com" is the hostname with "danastreet.com" being a domain and "secure" being a subdomain, "/quote/msft" being a path to the particular resource being requested by selection of the hyperlink, "danainfo" is a keyword, and "www.xyz.com" is the host where the requested resource resides. Hence, the domain name lookup (422) of the hostname "secure.danastreet.com" is resolved to the IP address of danastreet.com. The request is then sent (426) from the client 602 to the intermediary server 604. The request is, for example, as follows:

GET: /quote/msft:danainfo:host=www.xyz.com HTTP/1.0
    Host: secure.danastreet.com
    Cookie: DSID=123xyzzbc Other information can also be included within the request such as other cookies, encoding-accepted, etc. The cookie is, in this example, a session cookie and is used in determining whether the client 602 is authorized (514) for user with the intermediary server 604.

In the case of a secure request, the hostname within the request is not able to directly identify the remote server 608 where the request is eventually to be delivered. However, the hostname for the remote server 608 is obtained (526) from information provided with the request. More particularly, the information (i.e., host variable) provided as a suffix with the request. In this example, the suffix includes the information that the hostname of the remote server 608 is "www.xyz.com". Once the appropriate hostname has been obtained (526), a domain name lookup (528) on the hostname ("www.xyz.com") is performed. Next, a connection from the intermediary server 604 and the remote server 608 is opened (530) or maintained if already opened, and secure handshaking is performed (532). Any cookies in the data store 606 associated with the hostname and the requester are then obtained (534). Next, a request by the intermediary server 604 is sent (536) to the remote server 608. The request is, for example, as follows:

GET: /quote/msft HTTP/1.0
    Host: www.xyz.com
    Cookie: xyzUserID=sam

Other information can also be included within the request. Note that the cookie provided with the original request pertained to the intermediary server 604 and thus is not forwarded with the request to the remote server 608.

The remote server 608 receives the request and returns (538) a response header and some or all of the content of the requested resource. An exemplary response can have the following format:

HTTP/1.0 200 OK
    Set-cookie: xyzuserID=Samual, expires=01-Jul-2002
    Content-type: text/html
    Content-length: 2000
    Location: https://www.xyz.com/stockquote/msft
    <HTML>
    ***
    </HTML>

Since the response included a "cookie" to be set, the set-cookie command is remove from the response (542) and then saved (544) in the data store 606. Next, to the extent they are present, the hostnames within the headers are modified (546) to point to the intermediary server 604. In this example, the location header includes a full path (including hostname), namely, https://www.xyz.com/stockquote/msft, which is thus modified to https://secure.danastreet.com/stockquote/msft:danainfo:host=www.xyz.com. In this example, not only are the hostnames modified but also variables are added to the end (i.e., suffix) of the URL. With this example, the relative URLs need to be modified to include the variable information ("danainfo:host=www.xyz.com") at the end of the relative URLs. The hostnames for the relative URLs are properly provided by the browser application operating on the client 602 will cause the current hostname ("secure.danastreet.com") to be used for such paths. Next, processing through one or more plug-in(s) can be performed (554) to alter, modify or supplement the html data accompanying the response. The resulting HTML is saved (556) in the data store 606. If desired, a toolbar can be inserted (558) into the resulting HTML to facilitate operations or functions supported by the intermediary server 604. Still further the hostname portion of URLs within certain tags within the resulting HTML or those produced by scripting languages are modified (560, 562) to point to the intermediary server 604. For example, if the resulting HTML included the following hyperlink:

<a ref=https://www.xyz.com/quote/msft> then the hyperlink would be modified to the following:

<a ref=https://secure.danastreet.com/quote/msft:danainfo:host=www.xyz.com>

Also, if the resulting html include the following relative hyperlink:

<a ref=a.html> then the hyperlink would be modified to the following:

<a ref=a.html:danainfo:host=www.xyz.com>

As another example, the resulting HTML could also include hyperlinks not requiring a secure connection and thus be converted as noted above in the first example. Thereafter, the response including the modified HTML can be delivered (564) from the intermediary server 604 to the client 602. In any case, one advantage of this third exemplary approach is that the browser application at the client machine can execute scripting language instructions to perform the modifications, and thus alleviates some processing burden from the intermediary server.

The application plug-ins can operate to perform a variety of functions. Typically, the various application plug-ins can be considered as filters that operate in a serial fashion stacked one upon another and serve to alter or modify the HTML data. The modifications (or filtering) can serve to translate the HTML data between languages, remove advertisements from the HTML pages, provide customization for the requestors, etc.

Figure 7:
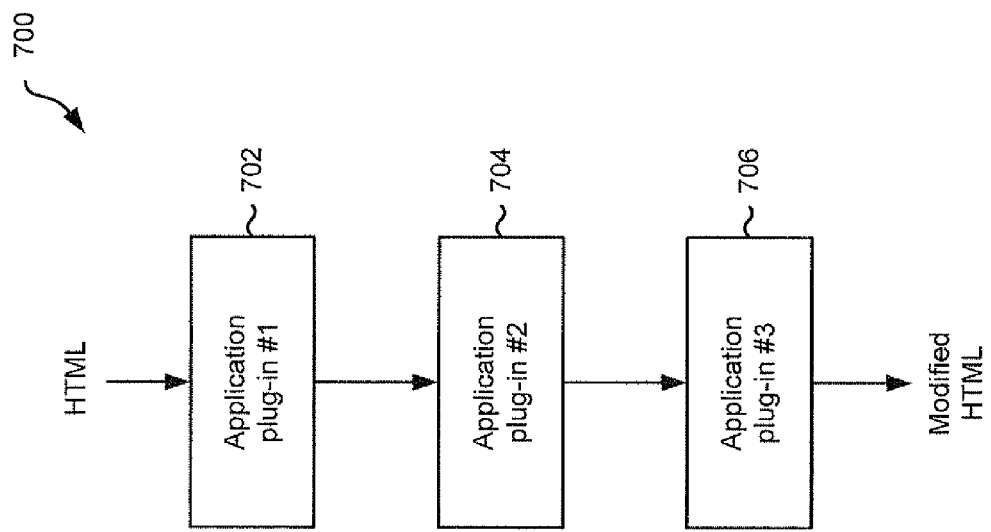
FIG. 7 is a diagram of application plug-in processing according to one embodiment of the invention.

FIG. 7 is a diagram of application plug-in processing 700 according to one embodiment of the invention. The application plug-in processing 700 is, for example, associated with application plug-ins that have been registered with the application plug-in framework 216 illustrated in FIG. 2A. Each application plug-in serves to, in some manner, alter, modify or supplement the HTML data associated with the response. The application plug-in processing 700 is, for example, performed by the operation 554 illustrated in FIG. 5D. The application plug-in processing 700 typically receives the HTML data associated with the response (though it may have already been partially modified, e.g., by operation 546 illustrated in FIG. 5C). In any case, the HTML data received is sent through one or more plug-in modules. Each of the plug-in modules can be provided by a different third-party to alter, modify or supplement the HTML data in different ways. In the embodiment shown in FIG. 7, the incoming HTML data is first sent to application plug-in #1 702, and then the resulting HTML data is passed through application plug-in #2 704, and then the resulting HTML data is supplied to an application plug-in #3 706. The modified HTML data output from the application plug-in #3 706 represents the HTML data after passing through the series of application plug-ins. In this manner, multiple third-party applications can be provided and supported by the intermediary server 100, 200. This allows different applications to alter the HTML data in different ways so that multiple features or services can be supported by the platform or architecture provided by the information retrieval system 100, namely, the intermediary server 108, 200.

Figure 8:
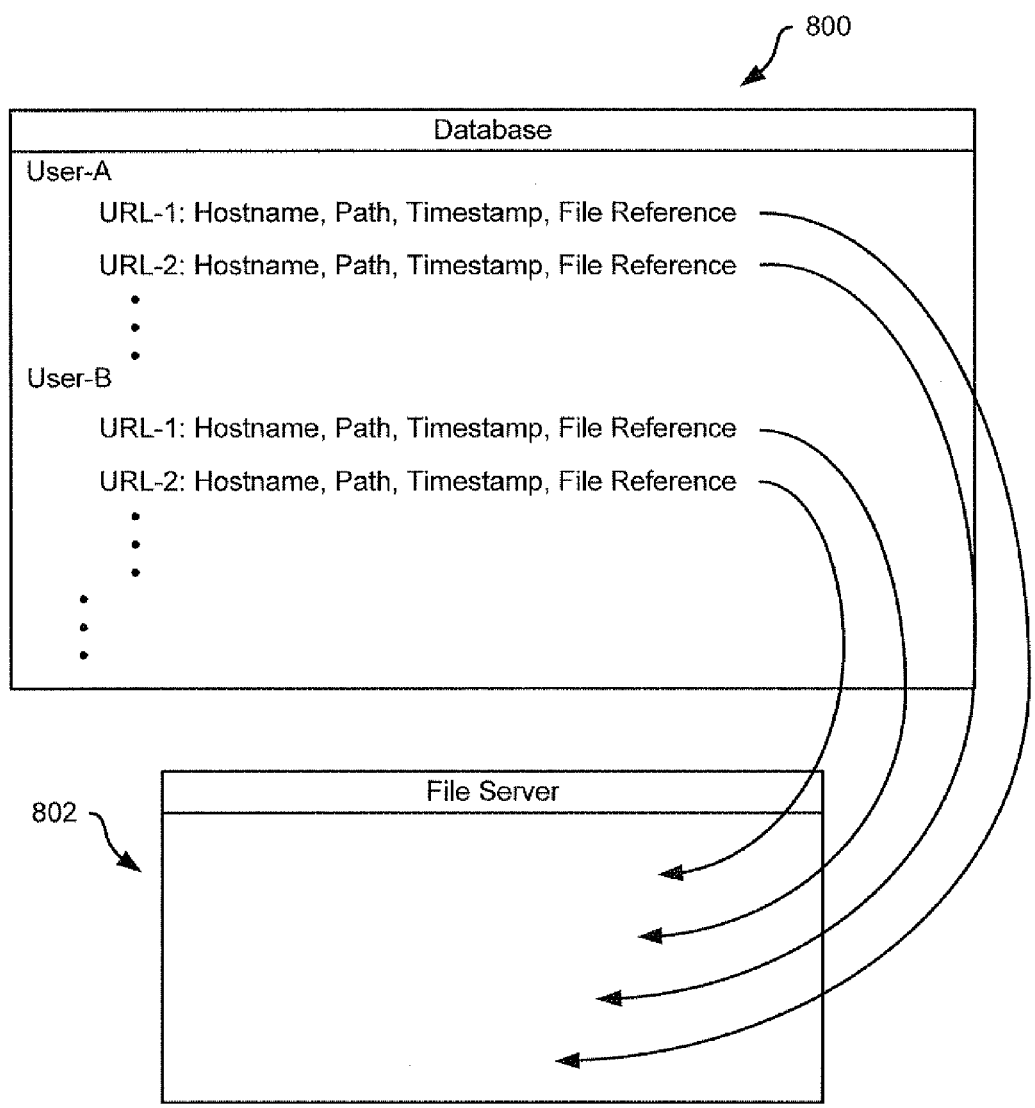
FIG. 8 illustrates a database and a file server according to one embodiment of the invention.

In accordance with another aspect of the invention, the intermediary server (e.g., intermediary server 108, 200) operates to store remote resources that have been requested by various requesters. As an example, operation 556 of FIG. 5D pertains to saving resulting HTML with reference to the particular requester. In general, the resources (e.g., HTML) can be stored in a data storage device such as the data storage device 210 illustrated in FIG. 2A. More particularly, however, the data storage device 210, can include a database and a file server. FIG. 8 illustrates a database 800 and a file server 802 according to one embodiment of the invention. The database 800 and the file server 802 together operate to provide intelligent data storage for resources that have been requested by requesters through the intermediary server. The database 800 illustrated in FIG. 8 stores the URL's that have been previously requested by various users. For example, as shown in FIG. 8, for user-A, the database 800 stores the URL, host name, path, timestamp, and a file reference for each remote resource request. The timestamp indicates the time at which the URL was requested or received. The intermediary server can set the timestamp or the requester can set the timestamp. The file reference is a unique reference to a file residing within the file server 802. The file stored within the file server 802 is the response (e.g., resulting HTML or content) that was previously viewed by the requester.

By providing the storage of resources that requesters have previously obtained through the intermediary server, the intermediary server can thus serve as storage of a history of resources that various users (requesters) have previously retrieved. This allows requesters to subsequently request from the intermediary server those resources that the users have previously requested through the intermediate server.

Figure 5A:
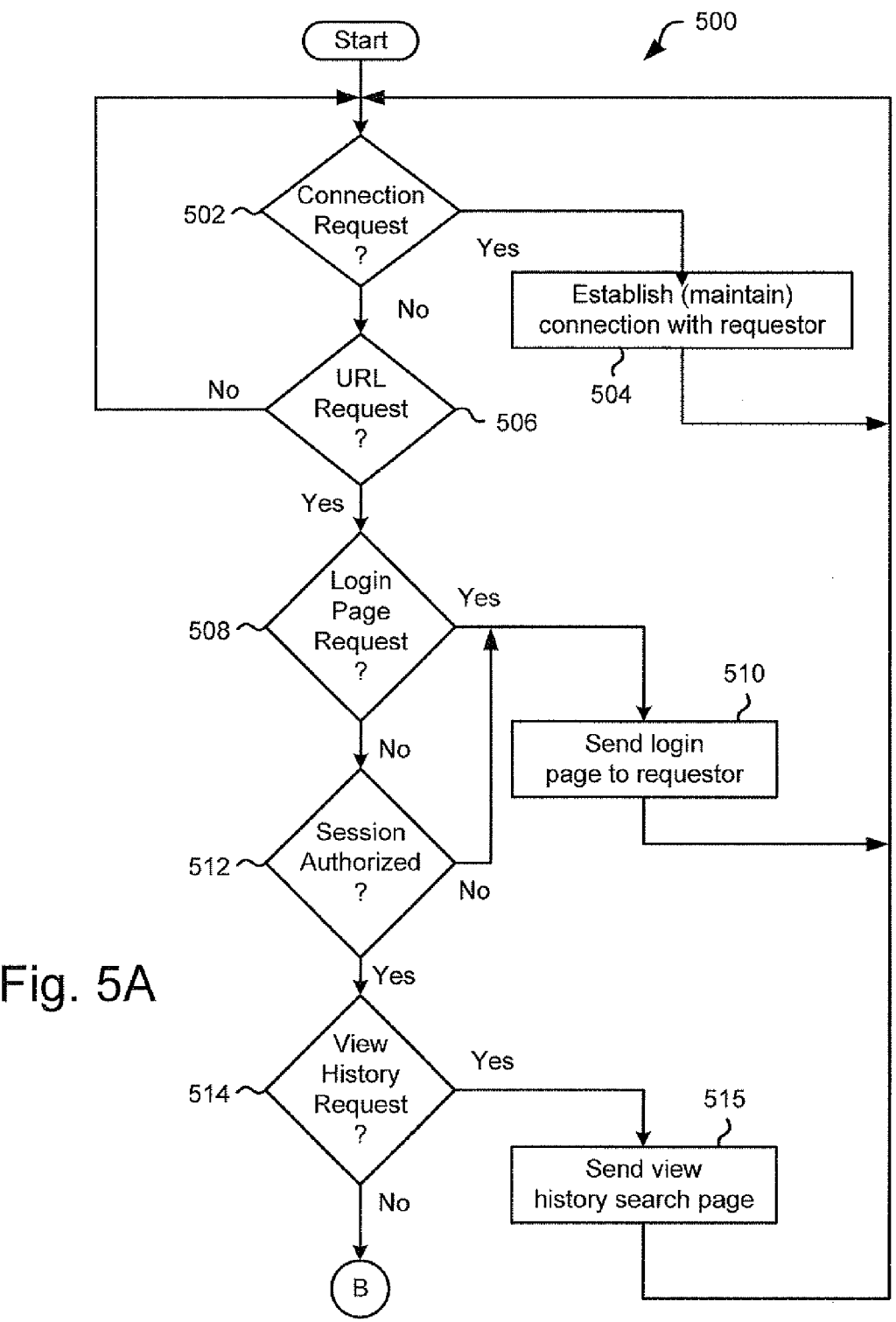
FIGS. 5A-5D are flow diagrams of intermediary processing according to one embodiment of the invention.
Figure 5B:
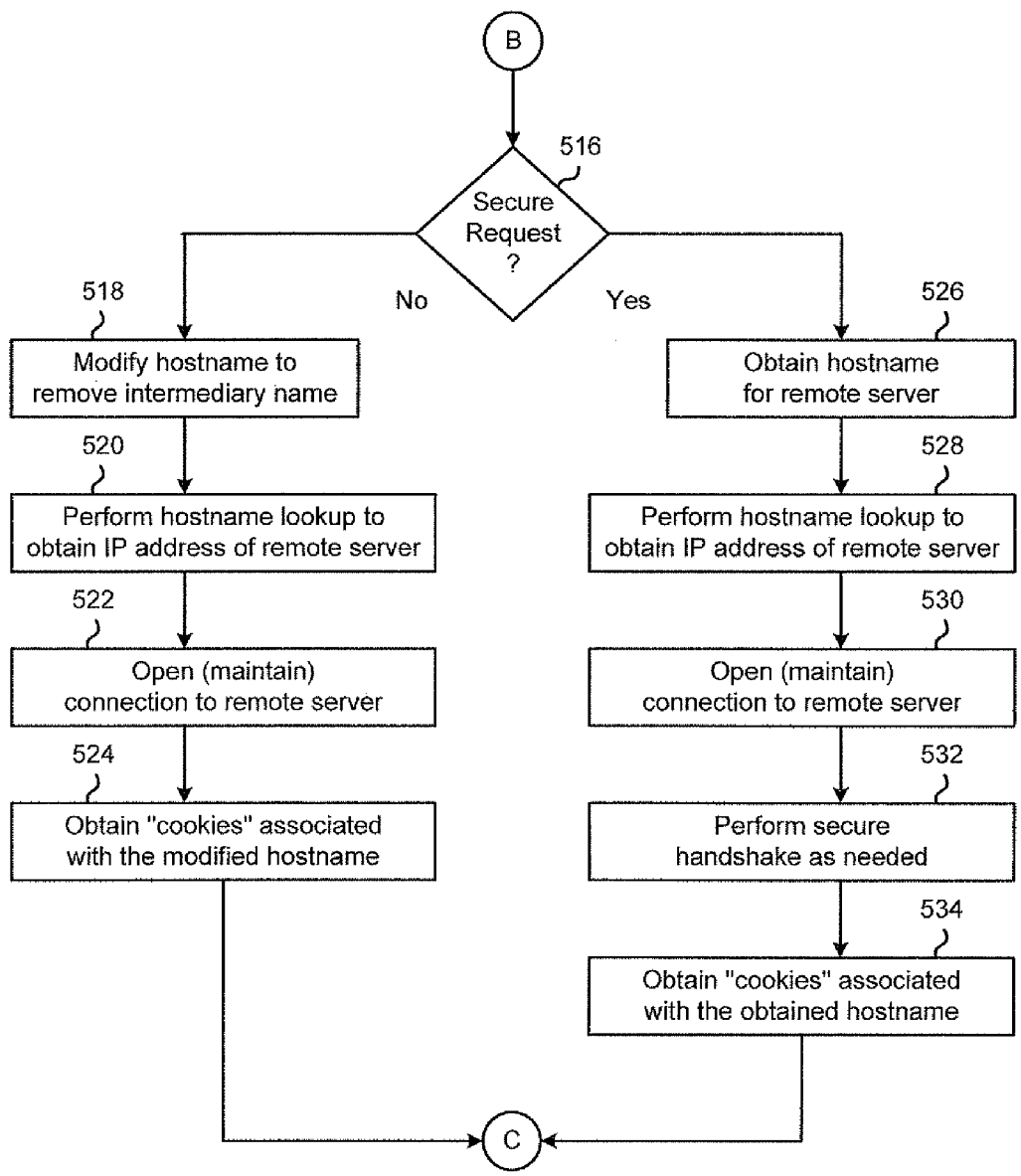
Figure 5C:
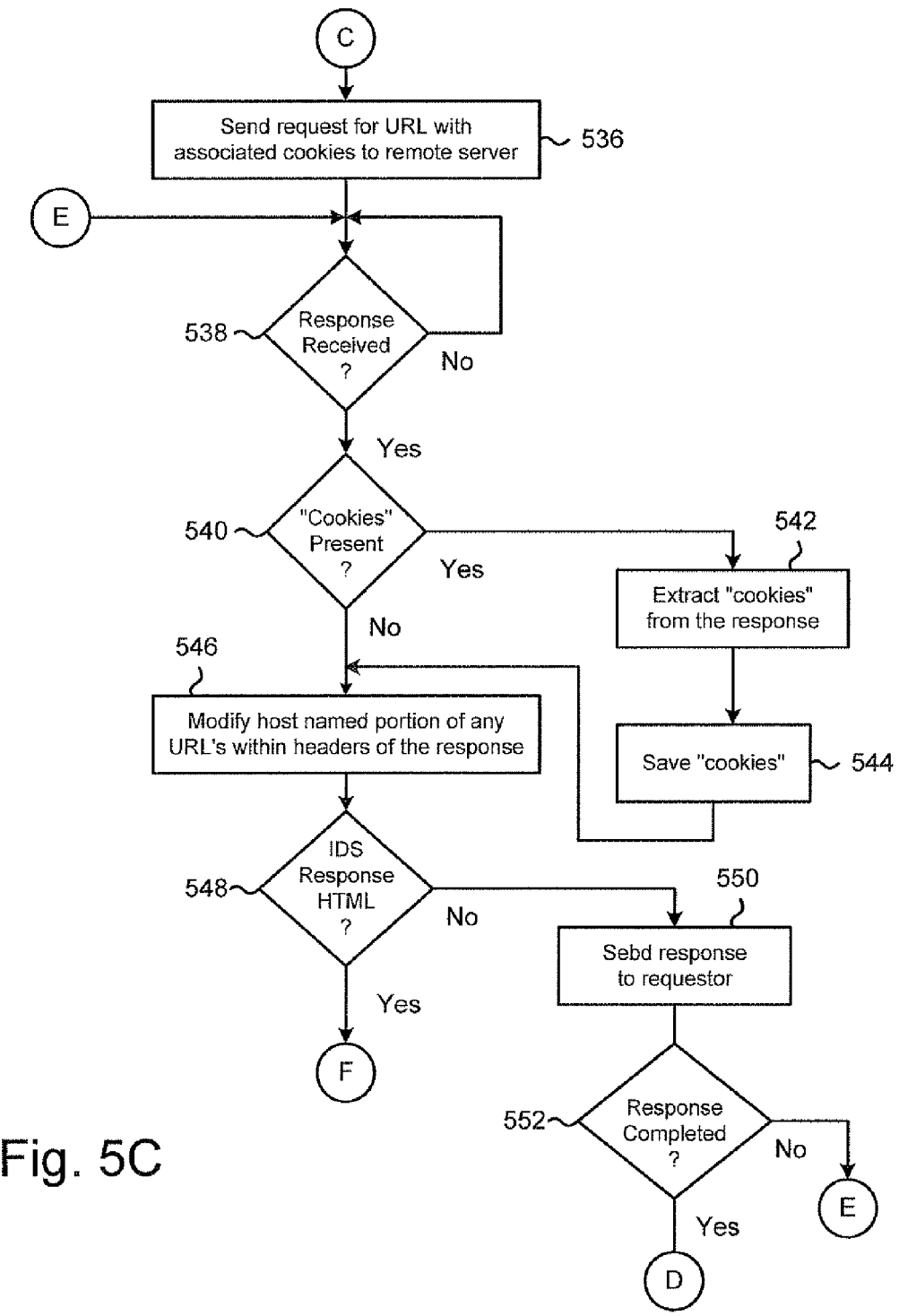
Figure 5D:
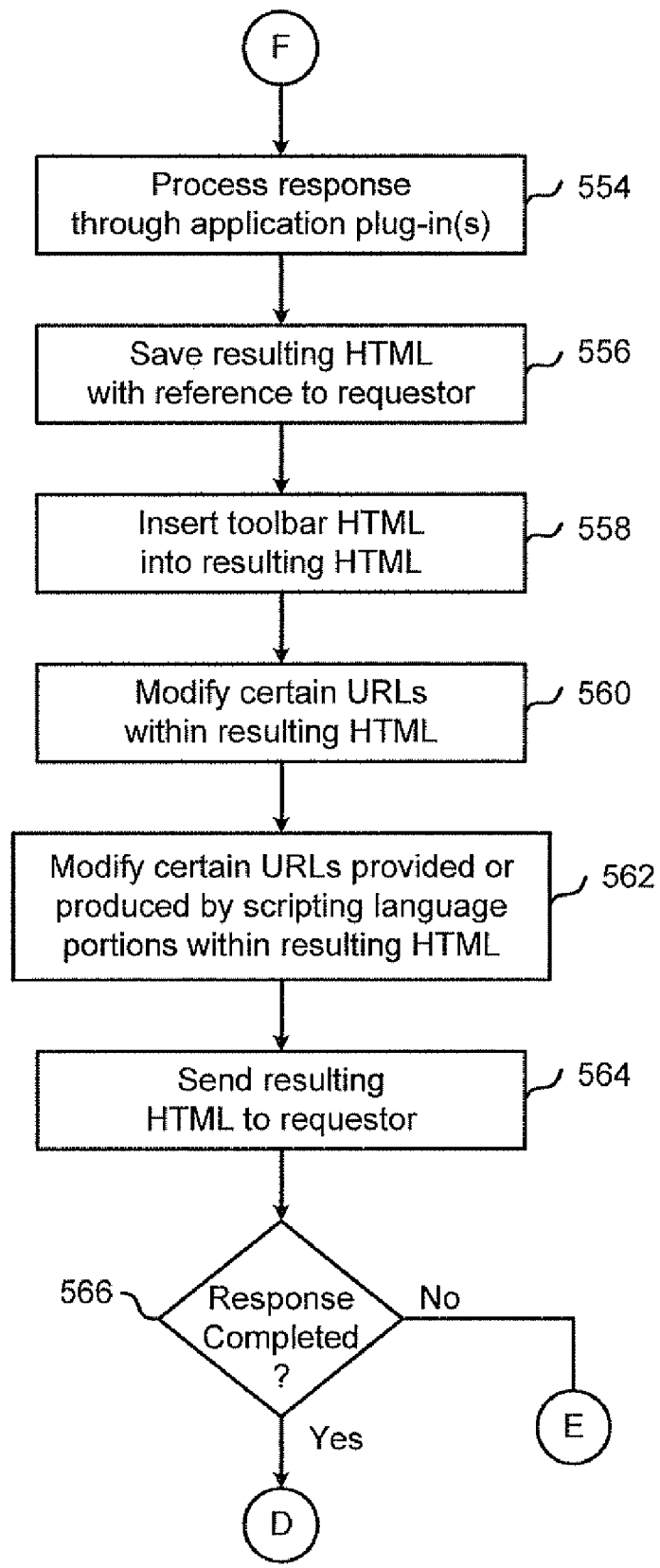

The retrieval of such previously requested resources can be facilitated by a view history search page (e.g., operation 515 of FIG. 5A). The view history search page can enable a requester to search through the resources (pages, documents, etc.) that the requestor has previously obtained through the intermediary server to thereby identify one or more particular previously viewed resources. The searching can include text searching of the resources themselves. The searching can also be facilitated by filtering on any of the parameters stored within the database, such as hostname or timestamp. In addition, the database could also store keywords or phrases for each or some of the resources, to thereby facilitate searching through such keywords or phrases. The timestamp can be used so that the storage of identical URL's (resources) can be achieved but distinguished the resources by their timestamp. This allows the same resource to be saved multiple times (even for a particular requester) and be distinguished by the different timestamps. The content of the resource saved at the different times may or may not be different. Hence, the view history search page could also link the URL's that are the same such that requesters are given the opportunity to retrieve the other versions of the same resource that have been stored at different times.

Still further, a resource request typically has internal links that retrieve other resources that form a portion of the overall resource. For example, a webpage can contain a link (e.g., internal link or hyperlink) to another resource location to retrieve an image. This is commonly done for providing a banner advertisement for the webpage. These internal links are also stored within the database in accordance with one embodiment of the invention. Hence, if a requester desires to retrieve a resource that has been previously stored, the webpage is typically initially requested and then retrieved from the data storage device. Once the webpage is received, the requester (e.g., network browser operating on the client machine) operates to request and then retrieve the internal links from the data storage device. If, for some reason, the content associated with the internal links is not available from the data storage device, than the user can be so informed and offered the opportunity to retrieve the content from the remote server or other options.

Another aspect of the invention concerns the insertion of a toolbar into the response (i.e., HTML data) provided by the remote server before the response is delivered to the requester. Such toolbar insertion can, for example, be performed at operation 558 of FIG. 5D. Alternatively, such toolbar insertion can be performed by an application plug-in such as shown in FIG. 7.

The toolbar that is inserted within the webpage (e.g., HTML data) can take a variety of different forms. More particularly, the toolbar is inserted into the HTML data of the webpage by inserting toolbar HTML into the HTML data. In one embodiment, the toolbar HTML includes graphical and/or textural content for the toolbar that is displayed when the HTML data is displayed when rendered on the client machine via a network browser. The toolbar HTML also includes one or more links to other resources. The links can be graphical or textual and thus be associated with the graphical and/or textual content. In one embodiment, the toolbar HTML also includes an activation script. The activation script is a script programming language understood by the network browser on the client machine. The activation script is executed by the browser at the client machine when seeking to render the toolbar HTML for the requester. Examples of the script programming language include JavaScript and VBscript. The toolbar HTML can be inserted into the HTML data in a variety of different positions. In one embodiment, the toolbar HTML is inserted into the HTML data directly following the initial body tag (<body>) so as to place the toolbar at the top portion of the rendered HTML page.

The insertion of the toolbar into web pages can be relatively straightforward or complex, depending upon the particular webpage. However, for a general solution, the toolbar insertion operations need to be intelligent enough to determine when it is appropriate to insert the toolbar and when not too. In this regard, the webpage (e.g., HTML data) is modified to insert JavaScript code following a body tag within each frame associated with the webpage. When executed at the client side, the JavaScript code determines if it is currently within a frame. If it is not currently in a frame, then the toolbar can simply be inserted. On the other hand, when the JavaScript code determines that it is within a frame, then it examines the size of the frame to determine whether the frame is large enough to support the toolbar being inserted. In other words, the JavaScript code for insertion of the toolbar is inserted into every page, indeed every frame of every page, but is only displayed in certain pages or frames.

Figure 9A:
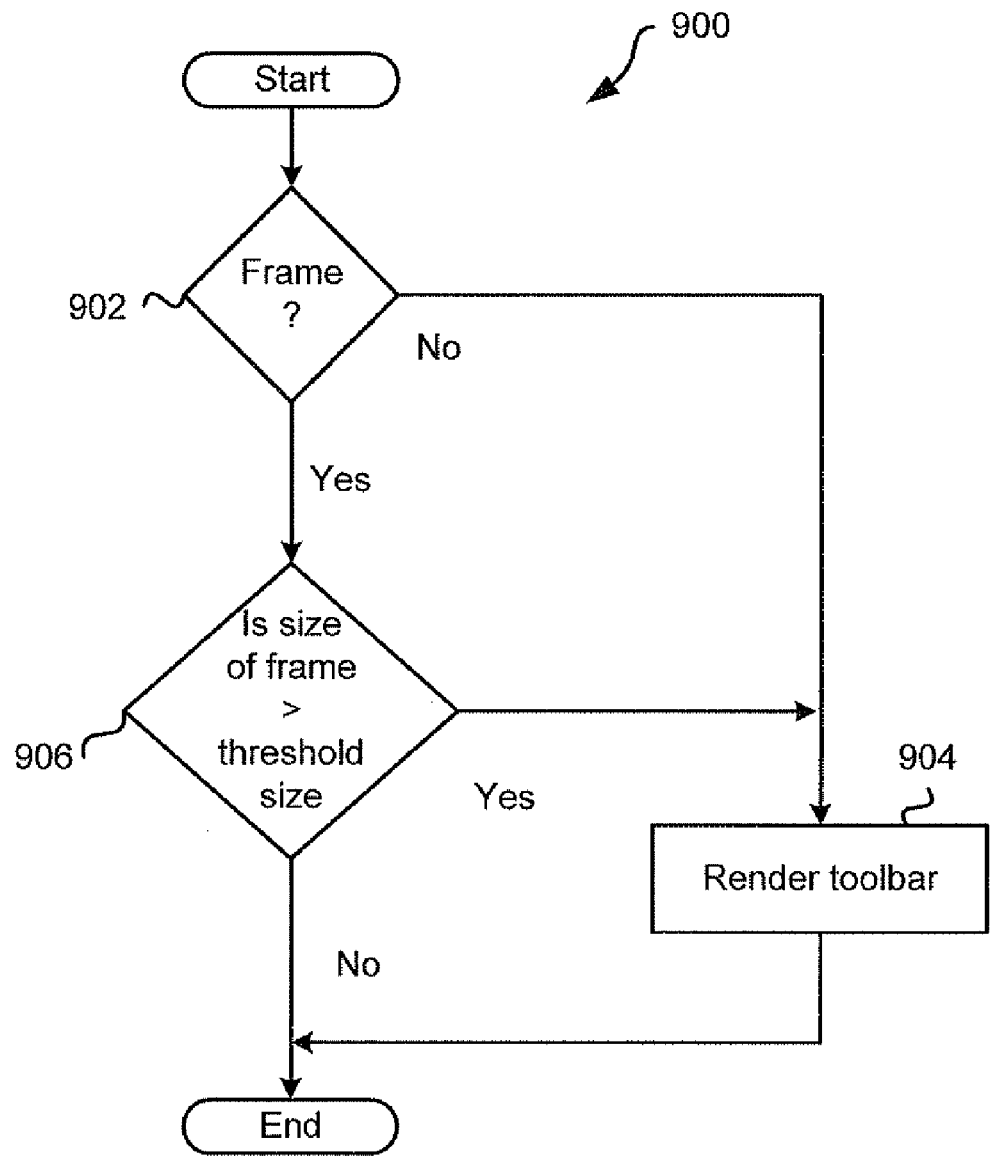
FIG. 9A illustrates a toolbar activation process according to one embodiment of the invention.

FIG. 9A illustrates a toolbar activation process 900 according to one embodiment of the invention. The toolbar activation process 900 is processing associated with an activation script. The toolbar activation process 900 is performed by the network browser at the client machine when the resulting HTML is being rendered by the network browser. The toolbar activation process 900 begins with a decision 902 that determines whether the activation script being executed is within a frame of the resulting HTML. The resulting HTML pertains to a webpage that is displayed by the network browser. Web pages, or their HTML description, can define none, one or multiple frames. The toolbar HTML is inserted into the webpage (resulting HTML) at least once and, if one or more frames are defined, inserted into each of the frames. When the decision 902 determines that the activation script being executed is not within a frame, than the toolbar can be rendered 904 as part of the webpage produced by the network browser. On the other hand, when the decision 902 determines that the activation script is within a frame, then a decision 906 determines whether the size of the frame is greater than a threshold size. Here, the size of the current frame is examined to determine whether it is of sufficient size (e.g., height and width) to properly support the toolbar. When the decision 906 determines that the size of the frame is greater than the threshold size, then the toolbar activation process 900 has determined that the frame is sufficiently large enough to support the toolbar and thus renders 904 the toolbar via the network browser. On the other hand, when the decision 906 determines that the size of the frame is not greater than the threshold size, than the toolbar is not rendered and the toolbar activation process 900 is complete and ends. Accordingly, the toolbar activation process 900 can be performed at least once for the webpage and multiple times if frames are present, such that each instance of the toolbar activation process 900 dynamically self-determines whether the toolbar instance should be rendered within the particular webpage or frame thereof.

An example of an activation script for performing operations 902 and 906 of the toolbar activation process 900 is as follows:

If (self==top||
(document.body?(document.body.clientWidth>400
&&document.body.clientHeight>200):
(self.innerWidth>400&&self.innerHeight>200))) [toolbar rendering HTML]

Note that the toolbar rendering HTML is then written to the network browser to render the toolbar when the "if" statement conditions are meet. Here, there are two alternative statement conditions, one for Netscape Navigator network browsers and another for Microsoft Internet Explorer network browsers.

Figure 9B:
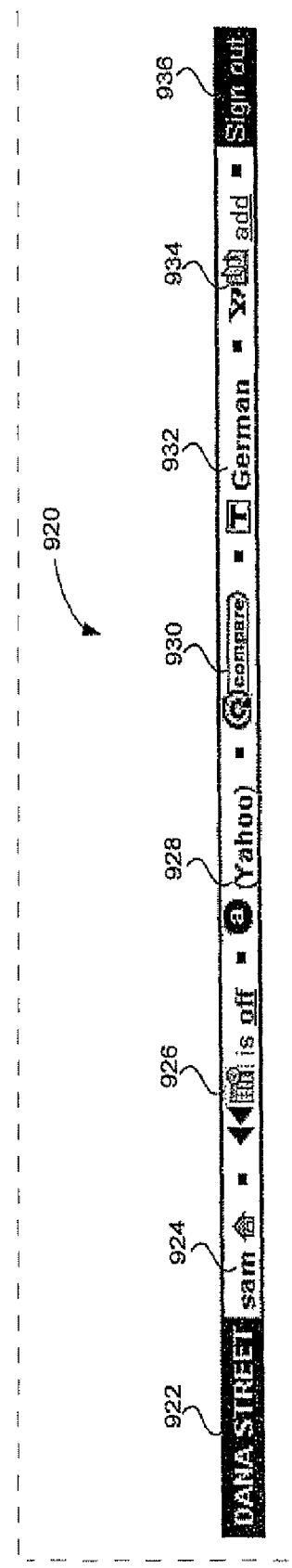
FIG. 9B is a representative toolbar that can be inserted into a webpage in accordance with one aspect of the invention.

FIG. 9B is a representative toolbar 920 that can be inserted into a webpage in accordance with one aspect of the invention. The representative toolbar 920 is, for example, inserted into the top or bottom of web pages. As noted above, in one embodiment of the invention, the representative toolbar 920 can be rendered in each of the frames of multi-frame web pages that are sufficiently large enough to support the representative toolbar 920.

The representative toolbar 920 includes a series of graphical links 922-936 that are displayed by a network browser. Upon selection of one of the graphical links 922-936, the network browser can be directed to display another resource, The graphical links 922-936 are hyperlinks to predetermined resources. The graphical link 922 represents a company logo "Dana Street" for the company that provides the intermediary server processing. Upon a user clicking on the graphical link 922, the customized homepage for the user provided by the intermediary server can be displayed. The graphical link 924 can display the name of the logged-on user (e.g., "sam") and can also be linked to the user's homepage within the system.

The graphical link 926 represents a history management application. Upon selecting the graphical link 926, a history search page can be displayed for the user. In addition, the graphical link 926 can also indicate whether the history management application for the user is "on" or "off" as well as permit the user to toggle between "on" and "off". A graphical link 928 represents a graphical icon associated with a third party application that provides information about the current site being viewed (e.g., yahoo). Here, the third party application pertains to an external service in which the "A" represents the logo of the external service provider (e.g., http://www.alexa.com). The graphical link 930 is an icon that links to a third party application that provides comparative purchasing options. Here, the external service providing the comparison information is, for example, http://www.clickthebutton.com. The graphical link 932 is a link to a translation application. As shown in FIG. 9B, the graphical link 932 also indicates that the translator is active in translating to a particular target language (e.g., German in this example). Selecting the graphical link 932 causes a dialog to appear such that a user can turn on and off the translation or switch target languages. The graphical link 934 is a link to a third party application that manages bookmarks on the Internet. The representative external service in this example is Yahoo! Bookmarks (http://bookmarks.yahoo.com). Hence, this graphical link 934, in particular, illustrates that third party applications, such as yahoo applications, which appear on a yahoo page toolbar can also be integrated into the representative toolbar 920 without change to their backend service. The graphical link 936 enables a user to log-out from the intermediary server.

The representative toolbar 920 illustrated in FIG. 9B is only one example of a toolbar. It should be recognized that many different toolbars can be used with the toolbar activation process 900. The toolbars can have various different appearances and can provide access to various different services, applications or features.

Figure 10:
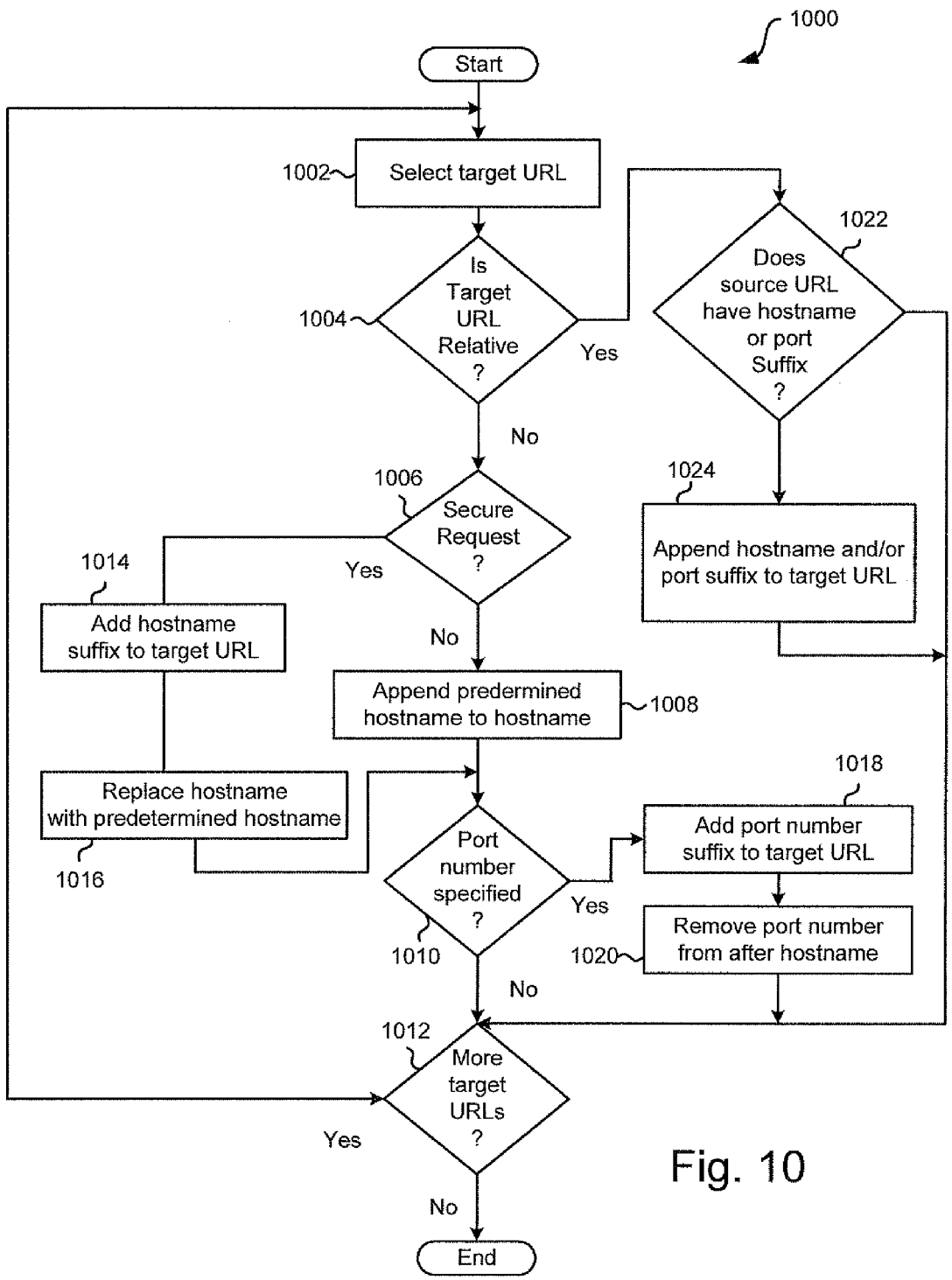
FIG. 10 is a flow diagram of URL modification processing according to one embodiment of the invention.

FIG. 10 is a flow diagram of URL modification processing 1000 according to one embodiment of the invention. The URL modification processing 1000 is, for example, processing performed by operation 560 of FIG. 5D. The URL modification processing 1000 can, for example, be performed by the HTML parser 218 and/or the HTTP handler 204 illustrated in FIG. 2A.

The URL modification processing 1000 begins by selecting 1002 a target URL within the resulting HTML (webpage). Typically, one or more target URLs are previously identified by scanning the resulting HTML data. Then, a decision 1004 determines whether the target URL is a relative URL. When the decision 1004 determines that the target URL is not a relative URL, then a decision 1006 determines whether the target URL is associated with a secure request (e.g., HTTPS). When the decision 1006 determines that the target URL is not associated with a secure request, then a predetermined hostname is appended 1008 to the hostname provided in the target URL. In other words, the hostname originally provided for the target URL is effectively rewritten such that the original hostname becomes a sub domain and the predetermined hostname becomes the domain for the target URL. Next, a decision 1010 determines whether a port number is specified in the target URL. When the decision 1010 determines that a port number is not specified in the target URL, no port number processing is needed so a decision 1012 then determines whether more target URLs to be processed. As previously noted, these target URLs can have been previously identified by scanning the resulting HTML data. When the decision 1012 determines that there are more target URLs, then the URL modification processing 1000 returns to repeat the operation 1002 and subsequent operations so that additional target URLs can be processed. Alternatively, when the decision 1012 determines that there are no more target URLs, then the URL modification processing 1000 is complete and ends.

On the other hand, when the decision 1006 determines that the target URL is associated with a secure request, then a hostname suffix is added 1014 to the target URL. Then, the hostname of the target URL is replaced 1016 with a predetermined hostname. Following operation 1016, the URL modification processing 1000 proceeds to the decision 1010.

When the decision 1010 determines that a port number is specified in the target URL, then a port number suffix is added 1018 to the target URL. Next, the port number is removed 1020 from after the hostname in the target URL. Following the operation 1020, the URL modification processing 1000 performs the decision 1012.

On the other hand, when the decision 1004 determines that the target URL is a relative URL, a decision 1022 determines whether the source URL has a hostname or port suffix. The source URL is the URL associated with the webpage (including the resulting HTML) that includes the target URL. When the decision 1022 determines that the source URL does have either a hostname or a port suffix, then the hostname and/or the port suffix are appended 1024 to the target URL. Following the operation 1024, as well as following the decision 1022 when the source URL does not have a hostname or a port suffix, the URL modification processing 1000 performs the decision 1012.

Additionally, although not shown in FIG. 10, it should be noted that the URL modification processing can also operate to add a unique identifier to the URL as a port number as discussed above.

Figure 11:
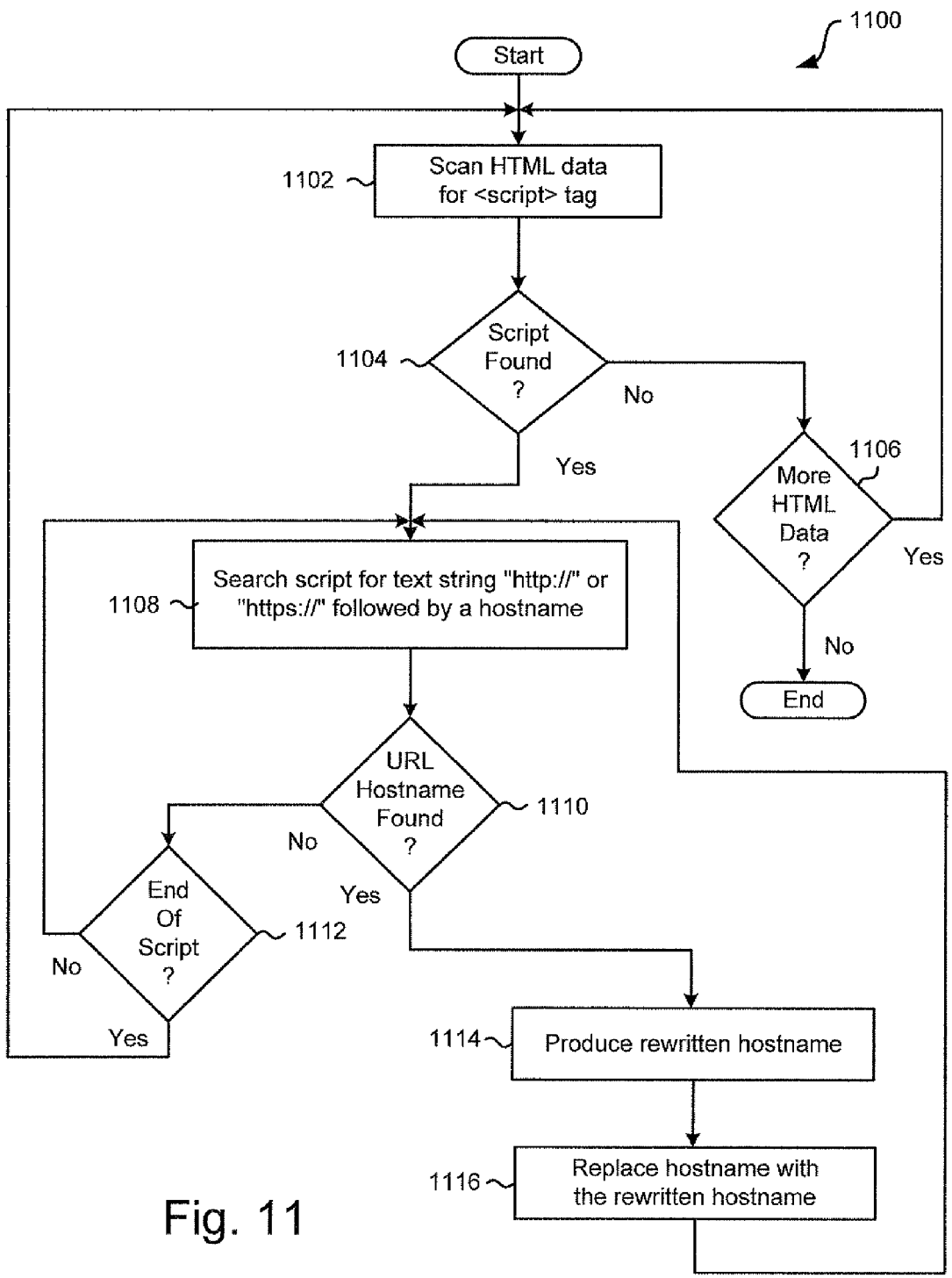
FIG. 11 is a flow diagram of a script modification processing according to one embodiment of the invention.

FIG. 11 is a flow diagram of a script modification processing 1100 according to one embodiment of the invention. The script modification processing 1100 is, for example, performed by operation 562 illustrated in FIG. 5D. In general, the script modification processing 1100 operates to modify script portions within the resulting HTML.

The script modification processing 1100 initially scans 1102 the HTML data (e.g., of the resulting HTML) for a <script> tag. A decision 1104 then determines whether a script has been found. When the decision 1104 determines that a script has not been found, then a decision 1106 determines whether there is more HTML data to be scanned. When the decision 1106 determines that there is more HTML data to be scanned, then the script modification processing 1100 returns to repeat the operation 1102 and subsequent operations. Alternatively, when the decision 1106 determines that there is no more HTML data to be scanned, the script modification processing 1100 is complete and ends.

On the other hand, when the decision 1104 determines that a script has been found, then the script is searched 1108 to locate text strings "http://" or "https://" followed by a hostname. A decision 1110 then determines whether a URL hostname has been found by the searching 1108 of the script. When the decision 1110 determines that a URL hostname has not been found, then a decision 1112 determines whether the end of the script has been reached. When the decision 1112 determines that the end of the script has not yet been reached, then the script modification processing 1100 returns to repeat the operation 1108 and subsequent operations. Alternatively, when the decision 1112 determines that the end of the script has been reached, then the script modification processing 1100 returns to repeat the operation 1102 and subsequent operations so that additional scripts can be found and processed.

On the other hand, when the decision 1110 determines that a URL hostname has been found, then a rewritten hostname is produced 1114. For example, if the URL hostname that was found is "xyz.com", the rewritten hostname that is produced 1114 can, for example, be "xyz.com.danastreet.com". The hostname provided within the script is then replaced 1116 with the rewritten hostname. Following the operation 1116, the script modification processing 1100 returns to repeat the operation 1108 and subsequent operations so that additional hostnames within the script can be similarly processed.

Figure 12A:
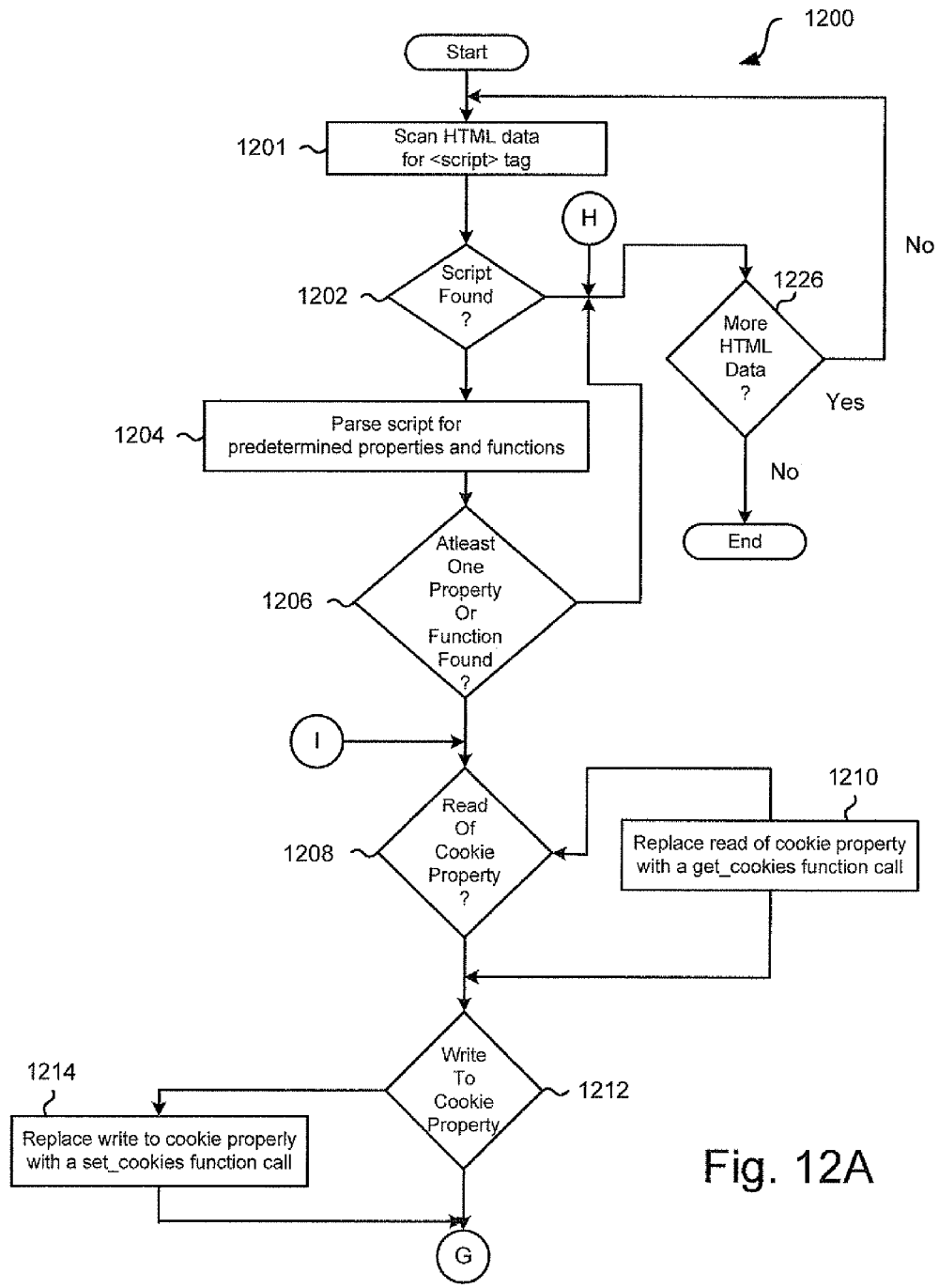
FIGS. 12A and 12B are flow diagrams of a script modification processing according to another embodiment of the invention.
Figure 12B:
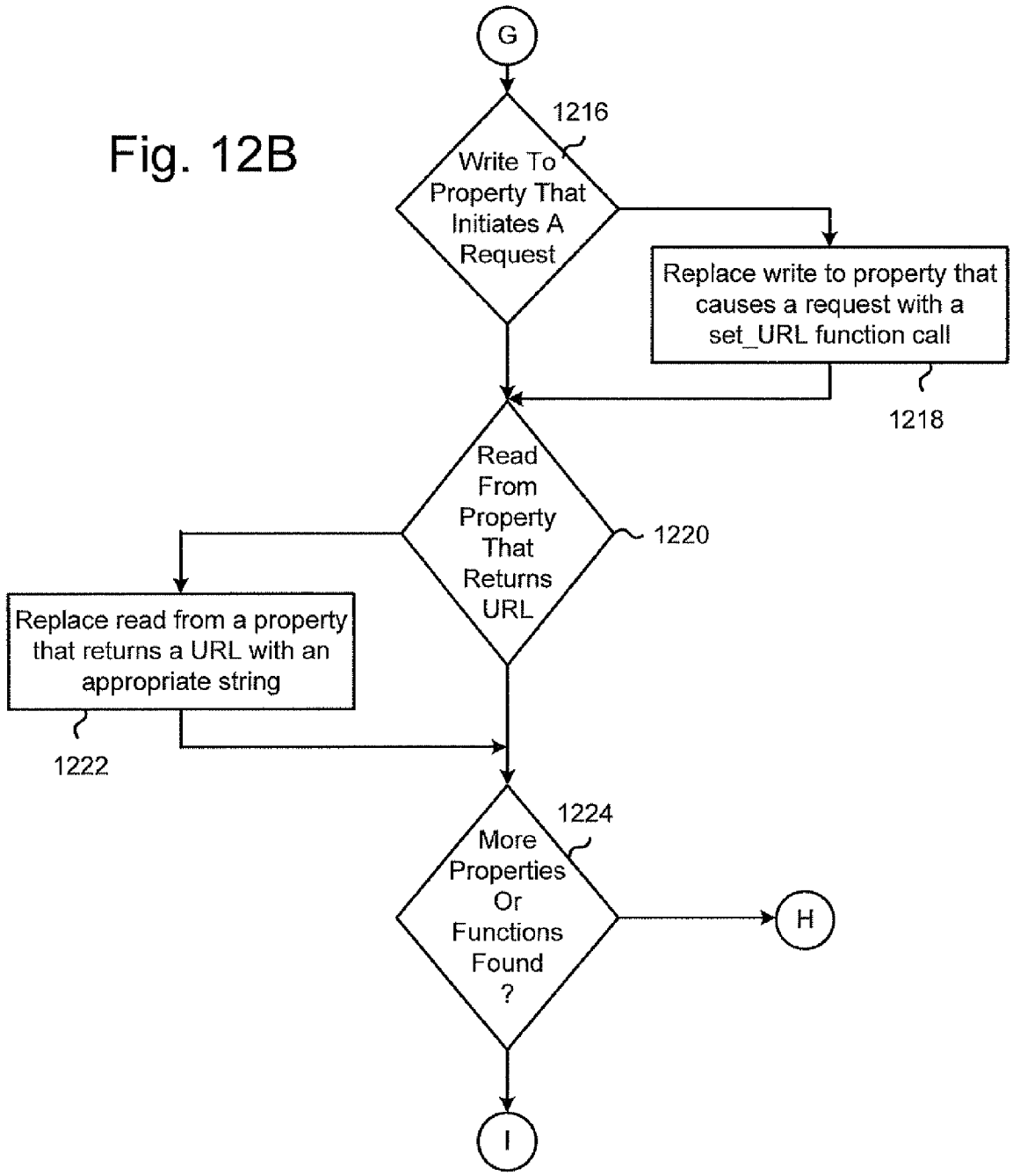

FIGS. 12A and 12B are flow diagrams of a script modification processing 1200 according to another embodiment of the invention. The script modification processing 1200 is, for example, performed by operation 562 illustrated in FIG. 5D. In general, the script modification processing 1200 operates to modify script portions within the resulting HTML.

The script modification processing 1200 initially scans 1201 the HTML data (e.g., of the resulting HTML) for a <script> tag. A decision 1202 then determines whether a script has been found. When the decision 1202 determines that a script has been found, then the script is parsed 1204 to determine or locate predetermined properties and functions associated with the script. As decision 1206 then determines whether at least one property or function has been found in the script. When the decision 1206 determines that at least one property or function has been found, then the script modification processing 1200 continues such that the script is modified with respect to the properties or functions found within the script so that the script operates as intended even though the intermediary server is interposed between client devices and remote servers.

In particular, for each property or function found within the script, the processing is as follows. A decision 1208 determines whether a selected property or function found within the script pertains to a read of a cookie property. When the decision 1208 determines that the identified property or function does pertain to a read of a cookie property, then the read of the cookie property is replaced 1210 with a get_cookies function call. Alternatively, when the decision 1208 determines that the identified property or function is not a read of a cookie property, as well as following the operation 1210, a decision 1212 determines whether the identified property or function pertains to a write to a cookie property. When the decision 1212 determines that the identified property or function does pertain to a write to a cookie property, the write to the cookie property is replaced 1214 with a set_cookies functions call.

On the other hand, when the decision 1212 determines that the identified property or function is not associated with a write to a cookie property, as well as following the operation 1214, a decision 1216 determines whether the identified property or function pertains to a write to a property that initiates a request. When the decision 1216 determines that the identified property or function does pertain to a write to a property that initiates a request, then the write to the property that initiates (causes) a request to be replaced 1218 with a set_URL function call. Alternatively, when the decision 1216 determines that the identified property or function does not pertain to a write to a property that initiates a request, as well as following the operation 1218, a decision 1220 determines whether the identified property or function pertains to a read from a property that returns a URL. When the decision 1220 determines that the identified property or function does pertain to a read from a property that returns a URL, then the read from a property that returns a URL is replaced 1222 with an appropriate string.

Furthermore, following the decision 1220 when the identified property or function does not pertain to a read from a property that returns a URL, as well as following the operation 1222, a decision 1224 determines whether more properties or functions were found in the script that still need to be processed. When additional properties or functions have been found and need processing, the script modification processing 1200 returns to repeat the decision 1208 and subsequent operations so that the additional properties or functions can be similarly processed. On the other hand, when the decision 1224 determines that all the properties or functions that have been found within the script have been processed, then the script modification processing 1200 performs a decision 1226. The decision 1226 is also performed when the decision 1202 determines that a script has not been found. The decision 1226 determines whether there is more HTML data to be scanned. When the decision 1226 determines that there is more HTML data to be scanned, then the script modification processing 1200 returns to repeat the operation 1201 and subsequent operations. Alternatively, when the decision 1226 determines that there is no more HTML data to be scanned, the script modification processing 1200 is complete and ends.

Representative examples of a get_cookies function, a set_cookies function, a set_URL function, and string substitution are provided below. These examples are provided to assist understanding and thus should not be deemed restrictions on any aspect of the invention. The following examples use JavaScript as the scripting language.

A first example with respect to the get_cookies function and operation 1210 is as follows. In this example, the script includes a script instruction
    var c=document.cookie;

which assigns the cookies associated with the document (page) to the variable c. This script instruction would be replaced with
    var c=get_cookies ("othercookie=abc";

which assigns the cookies present on the intermediary server for the particular domain of the document (page) and the particular user (e.g., "othercookie=abc"). In addition, the get_cookies function takes the cookies from the intermediary server as its argument and adds to it other cookies that are set by the script.

A second example with respect to the set_cookies function and operation 1214 is as follows. In this example, the script includes a script instruction
    document.cookie="selection=ijk; expires= . . . ";

which stores the cookies associated with the document (page) in the browser. This script instruction (statement) is replaced with
    document.cookie=set_cookie ("<domain>", "selection=ijk; expires= . . . ";);

which stores the cookies associated with the document (page) in the browser and also to the intermediary server. The set_cookie function includes two arguments. The first argument identifies the domain of the page having the script. The second argument is the value that was originally being assigned to the document.cookie property. The set_cookie function combines these two arguments and sets a cookie called servercookieX with no expiration, where X represents a distinguishing numeric value. The browser will cause this cookie to be sent to the intermediary server. The intermediary server can then incorporate the cookie into the cookie storage for the user. The cookie can also be used to expire an existing cookie in storage for the user. Once the cookie is stored at the intermediary server, the next page that the intermediary server returns will cause the servercookieX to expire because its no longer needed. Any calls to the set_cookie function will also append any cookie values provided within the servercookieX.

To further illustrate, consider the following example, where a page from www.xyz.com has the following script:
    document.cookie="a=b";
    var x=document.cookie, Assume also the www.xyz.com server has previously returned a cookie to the intermediary server that has name "id1" with value "sam". The code above will be transformed into:
    document.cookie=set_cookie ("www.xyz.com", "a=b");
    var x=get_cookie ("id1=sam");

The first line will cause a cookie "servercookie0" to be set that has the value "a=b~domain=www.xyz.com", hence the whole cookie will be:
    servercookie0=a=b~domain=www.xyz.com Note that the domain part of the servercookie0 is used purely by the intermediary server so that it knows which domain is setting the cookie. The second line calls the get_cookies function which takes its first argument (filled in by the intermediary server while the script was rewritten) and examines all servercookie0's cookies on the browser. It concatenates the first argument together with any servercookieX cookies, and returns the result:
    id1=sam; a=b Note, this is the same result that would have been returned from the original page had it not been rewritten.

A third example with respect to the set_URL function and operation 1218 is as follows. The set_URL function operates to modify properties that cause a request. In this example, the script includes a script instruction
    document.location="http://www.xyz.com/foo.html";

which directs the browser to a new page. Such a script instruction can be replaced with
    document.location=set_URL(" ","http://www.xyz.com/foo.html");

The set_URL function call takes two arguments. The first argument is filled in by the intermediary server while the script is being rewritten, and contains any parameters that would normally be provided in a suffix (e.g., "danainfo:") to follow a URL. It is not always needed, as will be explained below. The second argument is the URL, though it could actually be a script expression (e.g., function call) that assembles or returns a URL.

The set_URL function examines the URL being set and rewrites it to be of a form that will direct the browser to the intermediary server. As noted above, the modification to URLs can be achieved with various techniques.

If the page is using the hostname modification technique, then relative URLs do not need to be modified since the hostname encodes the necessary information. If the URL is a full URL, then the set_URL function has all of the information it needs to convert the URL so that either (i) "danastreet.com" is included in the hostname of the URL (hostname modification technique such as for the HTTP case), or (ii) a suffix (e.g., ":danaInfo:host=xxx") is appended to the URL (the HTTPS case). Thus, if the page that the script appears on is using the hostname modification technique, the first argument is not needed by the set_URL function.

Alternatively, if the page upon which the script is present is using the URL suffix technique, then a relative URL that is passed to the set_URL function needs to have the same suffix applied to it. In this case, the intermediary server will insert as the first argument to the set_URL function any arguments that need to be passed in the suffix. For example, if the URL of the page is:
  https://secure.danastreet.com/quote/msft:danaInfo:host=www.xyz.com and a script instruction on the page includes:
  document.location="/quote/ibm";

then the rewritten script instruction would look like:
  document.location=set_URL("Host=www.xyz.com", "/quote/ibm");

and the return result from the set_URL function would be:
  /quote/ibm:danaInfo:host=www.xyz.com which would result in a request from the browser for:
  https://secure.danastreet.com/quote/ibm:danaInfo:host=www.xyz.com Alternatively, if the script instruction were instead:
  document.location="https://www.abc.com/info/msft";

then the rewritten script instruction would look like:
  document.location=set_URL("Host=www.xyz.com", "https://www.abc.com/info/msft");

and the return result from the set_URL function would be:
  https://secure.danastreet.com/info/msft:danaInfo:host=www.abc.com Note that, in this case, the first argument to the set_URL function is not needed because the second argument is a full URL and contains all of the information necessary to construct the final URL.

It should be noted that there are many functions or properties that when written to can cause the browser to fetch a URL. Some examples include:
  window.open('url', . . . )
  form.action='url';
  document.location='url';
  document.location.replace('url');
  image.src='url';

A fourth example with respect to the string substitution and operation 1222 is as follows. The string substitution operates to modify properties that return a URL. Here, script instructions that read from a property that return a URL are replaced with a constant string. In this example, if the script includes
  var url=document.location;

such would be replaced by:
  var url="http://www.yahoo.com/foo.html";

This operation serves to ensure that any script examining its environment would not be confused by the fact that the actual URL of the page is different from what it expects. Note that there is more than one property that may need to be modified. Some examples of properties that can be so modified include:
  document.location (returns full URL)
  document.domain (returns just the hostname part of URL)

Although the above-described embodiments refer to the use of a single intermediary server within an information retrieval system, it should be recognized that the information retrieval system can also include a plurality of intermediary servers. The various intermediary servers can individually receive requests from client machines and forward them to the appropriate remote servers and return a response back through the intermediary server to the client machine. By having multiple servers, not only can additional processing power be obtained, but also load balancing and localization issues can be addressed. Load balancing can also be facilitated by more particularized secure request processing. For example, for popular (high traffic) websites such as trading.etrade.com, the secure hostname could be specified as "trading.etrade.com.danastreet.com" for the hostname modification approach to provide redirection to the intermediary server. For secure communications, authentication certificates are obtained for the hostnames so that a browser attempting such a secure connection does not alert the user of its absence. In this example then, a certificate for "trading.etrade.com.danastreet.com" would be obtained from a certification authority.

The various aspect of the invention described above can be used alone or in various combinations.

The invention is preferably implemented in software, but can be implemented in hardware or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that access to resources on remote servers via an intermediary server is facilitated. Another advantage of the invention is that both secure and unsecure requests can be handled. Still another advantage of the invention is that Universal Resource Locators (URLs), even those within scripts, of markup language documents can be modified.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for processing a request at a first server to form a modified request that is directed to a second server, the first and second servers being coupled to a network, comprising:
  identifying an initial hostname portion of the request, the initial hostname portion being associated with a network address of the first server;
  retrieving, from storage associated with the first server, a replacement hostname portion for the request based on a port number that is uniquely associated with the second server, the port number further comprising a suffix, associated with the request, which identifies a hostname of the second server, and
  where the replacement hostname portion is associated with a network address of the second server;
  replacing the initial hostname portion with the replacement hostname portion to form the modified request;
  performing a hostname lookup, based on the replacement hostname portion, to obtain an address of the second server;
  establishing a connection to the second server based on the address of the second server; and
  forwarding the modified request to the second server using the replacement hostname portion.

2. The method of claim 1, further comprising:
receiving information associated with the modified request from the second server, where the information includes at least one link to an additional network resource;
modifying the at least one link to form modified received information and to associate the at least one link with the first server; and
providing the modified received information to a requestor that issued the request.

3. The method of claim 2, where modifying the at least one link to form the modified received information further includes inserting content, relating to the first server, into the information.

4. The method of claim 1, further comprising:
retrieving server-supplied user, session, or state information associated with a requestor that issued the request and the second server from the storage associated with the first server,
where the modified request includes the retrieved server-supplied user, session, or state information.

5. The method of claim 4, where the server-supplied user, session, or state information comprises a cookie previously provided by the second server to the first server.

6. The method of claim 1, where the initial hostname portion is a predetermined hostname not associated with the replacement hostname.

7. The method of claim 1, where the request received from a requestor that issued the request includes a session identifier associated with the first server and the requestor.

8. The method of claim 1, where the request is a request for a secure connection.

9. An intermediary server, comprising:
logic to receive a request from a client device, the request including an initial hostname portion associated with the intermediary server;
logic to retrieve a replacement hostname portion, associated with a remote server, from a storage associated with the intermediary server based on the received request and based on a port number that is uniquely associated with the remote server, where the port number further comprises a suffix associated with the request and that identifies a hostname of the remote server;
logic to modify the received request to include the retrieved hostname portion to form a modified request;
logic to perform a hostname lookup, based on the retrieved hostname portion, to obtain an address of the remote server;
logic to establish a connection to the remote server based on the address of the remote server; and
logic to forward the modified request to the remote server.

10. The intermediary server of claim 9,
where the logic to receive the request further comprises logic to determine whether the received request is a request for a secure connection between the intermediary server and the remote server, and
where the replacement hostname portion is retrieved when the received request is a request for a secure connection between the intermediary server and the remote server.

11. The intermediary server of claim 9, where the initial hostname portion is a predetermined hostname not associated with the replacement hostname portion.

* * * * *